US011949302B2

(12) United States Patent
Ganev et al.

(10) Patent No.: US 11,949,302 B2
(45) Date of Patent: Apr. 2, 2024

(54) ELECTRIC MACHINE STATOR WINDING

(71) Applicant: Honeywell International Inc., Charlotte, NC (US)

(72) Inventors: Evgeni Ganev, Torrance, CA (US); Robert Alan Dietrich, Montebello, CA (US); Jens Gehrke, Rancho Palos Verdes, CA (US)

(73) Assignee: Honeywell International Inc., Charlotte, NC (US)

( * ) Notice: Subject to any disclaimer, the term of this patent is extended or adjusted under 35 U.S.C. 154(b) by 453 days.

(21) Appl. No.: 16/997,720

(22) Filed: Aug. 19, 2020

(65) Prior Publication Data
US 2022/0060073 A1 Feb. 24, 2022

(51) Int. Cl.
*H02K 3/18* (2006.01)
*H02K 1/14* (2006.01)
*H02K 9/22* (2006.01)
*H02K 15/095* (2006.01)

(52) U.S. Cl.
CPC ............... *H02K 3/18* (2013.01); *H02K 1/146* (2013.01); *H02K 9/22* (2013.01); *H02K 15/095* (2013.01)

(58) Field of Classification Search
CPC ........ H02K 1/146; H02K 15/095; H02K 9/22; H02K 3/18; H02K 3/04
See application file for complete search history.

(56) References Cited

U.S. PATENT DOCUMENTS

| 6,366,000 | B1* | 4/2002 | Higashino | H02K 9/06 310/43 |
| 6,501,205 | B1* | 12/2002 | Asao | H02K 3/12 310/184 |
| 10,312,760 | B2* | 6/2019 | Marvin | H02K 3/30 |
| 2013/0106232 | A1 | 5/2013 | Kobayashi et al. | |
| 2015/0130322 | A1 | 5/2015 | Hazeyama et al. | |
| 2015/0188371 | A1* | 7/2015 | Kato | H02K 15/045 310/208 |
| 2015/0188372 | A1 | 7/2015 | Yokota et al. | |
| 2018/0191218 | A1* | 7/2018 | Lee | H02K 1/20 |

(Continued)

FOREIGN PATENT DOCUMENTS

| EP | 2387135 A2 * | 11/2011 | ............. H02K 15/04 |
| EP | 2688183 A2 * | 1/2014 | ........... H02K 15/045 |

(Continued)

OTHER PUBLICATIONS

EP-2688183 machine translation Oct. 7, 2022.*

(Continued)

Primary Examiner — Leda T Pham
(74) Attorney, Agent, or Firm — Shumaker & Sieffert, P.A.

(57) ABSTRACT

In some examples, a stator assembly includes a stator body including a base portion and a plurality of stator teeth projecting radially inward from the base portion. The stator assembly further includes an electrically conductive member wound about a tooth of the plurality of stator teeth to define a winding about the tooth, the winding comprising a single layer of the conductive member and including a plurality of turns of the electrically conductive member, wherein the electrically conductive member has a thickness in the radial direction that is less than its width in a direction perpendicular to the radial direction.

13 Claims, 13 Drawing Sheets

(56) References Cited

U.S. PATENT DOCUMENTS

2018/0269757 A1 9/2018 Fiederling et al.
2021/0021167 A1 1/2021 Maeda et al.

FOREIGN PATENT DOCUMENTS

| EP | 2688183 A2 | 1/2014 |
|----|------------|--------|
| EP | 3783629 A1 | 2/2021 |
| JP | 2002223542 A | 8/2002 |
| JP | 2010081787 A | 4/2010 |
| JP | 2014204512 A1 | 10/2014 |
| WO | 2019203076 A1 | 10/2019 |

OTHER PUBLICATIONS

EP-2387135 machine translation Oct. 7, 2022.*
Extended Search Report from counterpart European Application No. 21189747.5 dated Jan. 28, 2022, 10 pp.
Response to Extended Search Report dated Jan. 28, 2022, from counterpart European Application No. 21189747.5 filed Mar. 1, 2022, 42 pp.
Communication pursuant to Article 94(3) EPC from counterpart European Application No. 21189747.5 dated Aug. 28, 2023, 8 pp.
Response to Communication pursuant to Article 94(3) EPC dated Aug. 28, 2023, from counterpart European Application No. 21189747.5 filed Oct. 13, 2023, 12 pp.

* cited by examiner

ELECTRIC MACHINE STATOR WINDING

TECHNICAL FIELD

The present disclosure relates to electric machines.

BACKGROUND

An electric machine may be an electromechanical energy converter that converts electrical energy to mechanical energy (e.g., in the case of an electric motor) or mechanical energy to electrical energy (e.g., in the case an electric generator). Rotating electric machines may use electromagnetic forces between a stator and a rotor during operation. Alternating electrical currents in electric machines may be carried by windings comprised of one or more conductors wound around a magnetic material.

SUMMARY

In some examples, the disclosure describes a stator assembly for an electric machine, the assembly comprising: a stator body including a base portion and a plurality of stator teeth projecting radially inward from the base portion; and an electrically conductive member wound about a tooth of the plurality of stator teeth to define a winding about the tooth, the winding comprising a single layer of the conductive member and including a plurality of turns of the electrically conductive member, wherein the electrically conductive member has a thickness in the radial direction that is less than its width in a direction perpendicular to the radial direction.

In some examples, the disclosure describes an electric machine comprising: a rotor; and a stator comprising one or more stator assemblies, the one or more stator assemblies comprising: a stator body including a base portion and a plurality of stator teeth projecting radially inward from the base portion; and an electrically conductive member wound about a tooth of the plurality of stator teeth to define a winding about the first tooth, the winding comprising a single layer of the conductive member and including a plurality of turns of the electrically conductive member, wherein the electrically conductive member has a thickness in the radial direction that is less than its width in a direction perpendicular to the radial direction.

In some examples, the disclosure describes a method of forming a stator assembly, the method comprising forming a single-layer winding of an electrically conductive member including a plurality of turns around a stator tooth projecting radially inward from a base portion, wherein the electrically conductive member has a thickness in the radial direction that is less than its width in a direction perpendicular to the radial direction.

The details of one or more examples are set forth in the accompanying drawings and the description below. Other features, objects, and advantages will be apparent from the description and drawings, and from the claims.

BRIEF DESCRIPTION OF THE DRAWINGS

The details of one or more examples are set forth in the accompanying drawings and the description below. Other features, objects, and advantages will be apparent from the description and drawings, and from the claims.

DETAILED DESCRIPTION

Figure 1:
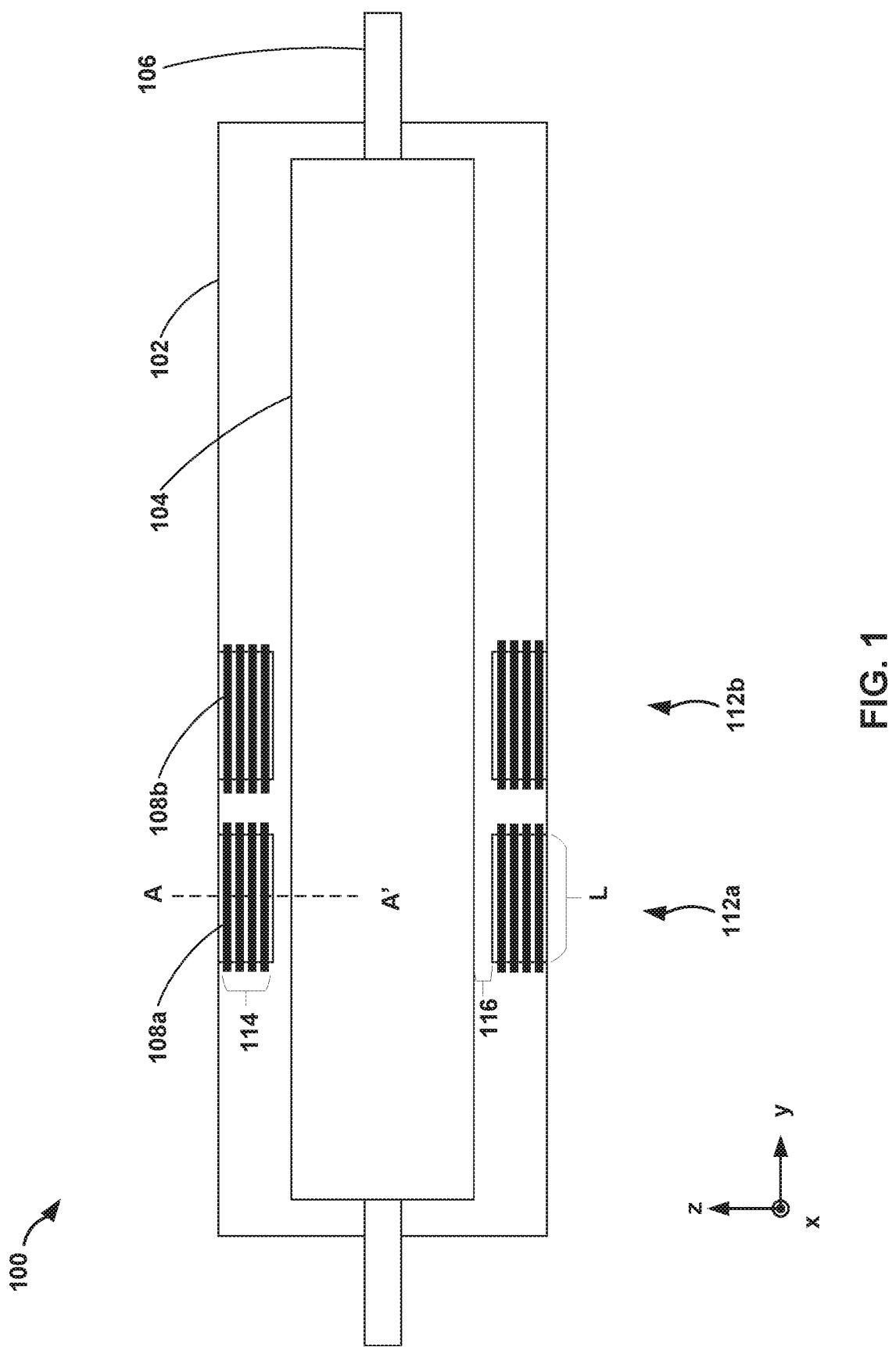
FIG. 1 is a cross-sectional diagram illustrating an example electric machine, in accordance with examples of the present disclosure.

In some examples, the disclosure relates to electric machines and methods of making and/or using the same. As described below, an example electric machine may include a stator assembly including a plurality of windings wound about a plurality of stator teeth spaced from each other circumferentially around the longitudinal axis of the electric machine and extending radially inwards towards the longitudinal axis of the electric machine.

Electric machines, such as electric rotating machines, may play a significant role in the modern aerospace industry and modern military industry. This is particularly true in more electric architectures (MEA) for aircraft and spacecraft.

In some instances, the commercial aircraft business is moving towards MEA as well as electric and hybrid propulsion. Some vehicles in service have already implemented all electric architectures. Military ground vehicles have migrated toward hybrid electric technology, where the main propulsion is performed by electric drives. Therefore, increased demand for electric machines has emerged. Future space vehicles may require electric power-generation systems for thrust vector and flight control actuation. These systems may require greater robustness and offer reduced operating costs and increased safety compared to the existing machines.

These new aerospace and military trends have significantly increased electrical power generation and utilization needs. The overall result has been a substantial increase in the challenges to accommodate electrical equipment on the new platforms. This has led to increased operating voltages, and efforts to reduce system losses, weight, and volume. A new set of electrical power quality and electromagnetic interference (EMI) requirements has been created to satisfy system quality and performance. The latest tendency as a part of MEA is the energy-efficient aircraft where electric power and heat management are heavily inter-related. Therefore, overall system performance improvement and specifically power density increases may be necessary for the new-generation hardware. This particularly applies to the electric rotating machines for propulsion, which may be a substantial contributor to the weight, volume, and cost of the electric systems.

Since many electric machines are a part of the MEA aircraft, power and torque densities may be a major concern. The ability to cool the electric machines with reduced or eliminated provisions may also be important for the overall improvement of the vehicle performance and cost. Designing electric rotating machines satisfying these challenging requirements is not a trivial task.

The slot "fill factor" for an electric machine using magnet wire may be relatively low (e.g., about 37% or less) for manually wound machines. For preformed machine wound stators the fill factor may be even less (e.g., about 30% or less). Multistrand wire, such as Litz wire, may present better high frequency capabilities and may achieve a similar fill factor, but at increased cost and with increased cooling challenges. A rectangular solid wire (bus bars) may achieve an increased fill factor of, e.g., around 50%, and improved cooling capabilities, e.g., using end turn spay cooling. The fill factor improvement of bus bars may come at the detriment of increased losses at high frequencies and harmonics.

The slot fill factor may define the length of the stator teeth in an electric machine as well as the diameter of the steel lamination stack. Hence, the fill factor may be a major driver for weight and volume as well as the ability to cool the machine. In a typical electric machine a hot spot occurs in the end turn of the stator winding and may be a substantial limiting factor for removing the heat.

There is a need in the aerospace industry for a new generation of electric machines with increased fill factor capable of providing improved performance and that may be easier to cool. Heat generated by windings, in addition to fill factor, may affect the performance and lifetime of an electric machine. Stator winding systems and techniques described herein may improve the performance of electric machines by increasing the winding fill factor and improving heat removal from the winding.

FIG. 1 is a cross-sectional diagram illustrating an example electric machine 100, in accordance with examples of the present disclosure. In the example shown, electric machine 100 includes stator 102, rotor 104, and drive shaft 106. In some examples, electric machine 100 may be either, or both, of an electric generator configured to convert mechanical energy to electrical energy or an electric motor configured to convert electrical energy to mechanical energy. In some examples, electric machine 100 may be a switched reluctance motor (SRM) or an electric machine using a Halbach array of permanent magnets.

In the example shown, rotor 104 in connected to drive shaft 106, and both rotor 104 and drive shaft 106 are configured to rotate about a longitudinal axis, e.g., the y-direction as illustrated. Rotor 104 may include one or more permanent magnets and/or one or more electromagnets. When electric machine 100 is operating as a generator, a torque may be applied to rotor 104, e.g., via drive shaft 106, may cause a current to flow in conductive windings in stator 102 and/or rotor 104 through interacting magnetic fields. When electric machine 100 is operating as a motor, electrical current flowing through conductive windings in stator 102 and/or rotor 104 may cause a torque on rotor 104 through interacting magnetic fields, which drives the rotation of shaft 106.

In the example shown, stator 102 may be comprised of one or more of stator bodies 112a and 112b, collectively stator bodies 112, each stator body including a base portion (not labelled in FIG. 1) and a plurality of stator teeth 108a and 108b, collectively stator teeth 108. Stator teeth 108 may project radially inward towards the longitudinal axis of rotor 104, e.g., projecting in the z-direction as illustrated, from the base portion. In some examples, the plurality of stator teeth 108 of stator body 112a may be disposed circumferentially around the longitudinal axis, e.g., in the x-z plane about the y-axis as illustrated, and as further described and illustrated below with respect to FIG. 2 below. Stator 102 may include a single stator body 112a having a length L in the longitudinal direction, e.g., the y-direction as illustrated. In some examples, stator body 112a may have a length L that is substantially the entire length of stator 102. In other examples, stator 102 may include a plurality of stator bodies 112 disposed along the longitudinal direction, each having a length L that is substantially less than the length of stator 102. In some examples, the plurality of stator bodies 112 may have the same length L, and in some examples the plurality of stator bodies 112 may have differing lengths.

In some examples, stator teeth 108 may define a plurality of slots between stator teeth 108 (e.g., stator slots 210 illustrated and described below with respect to FIG. 2, but not visible in the cross-sectional diagram illustrated in FIG. 1). A plurality of single-layer stator windings 114 may be wound around the plurality of stator teeth 108, and the plurality of single-layer windings 114 may be configured to fill at least 40% of the slot volume.

Figure 2:
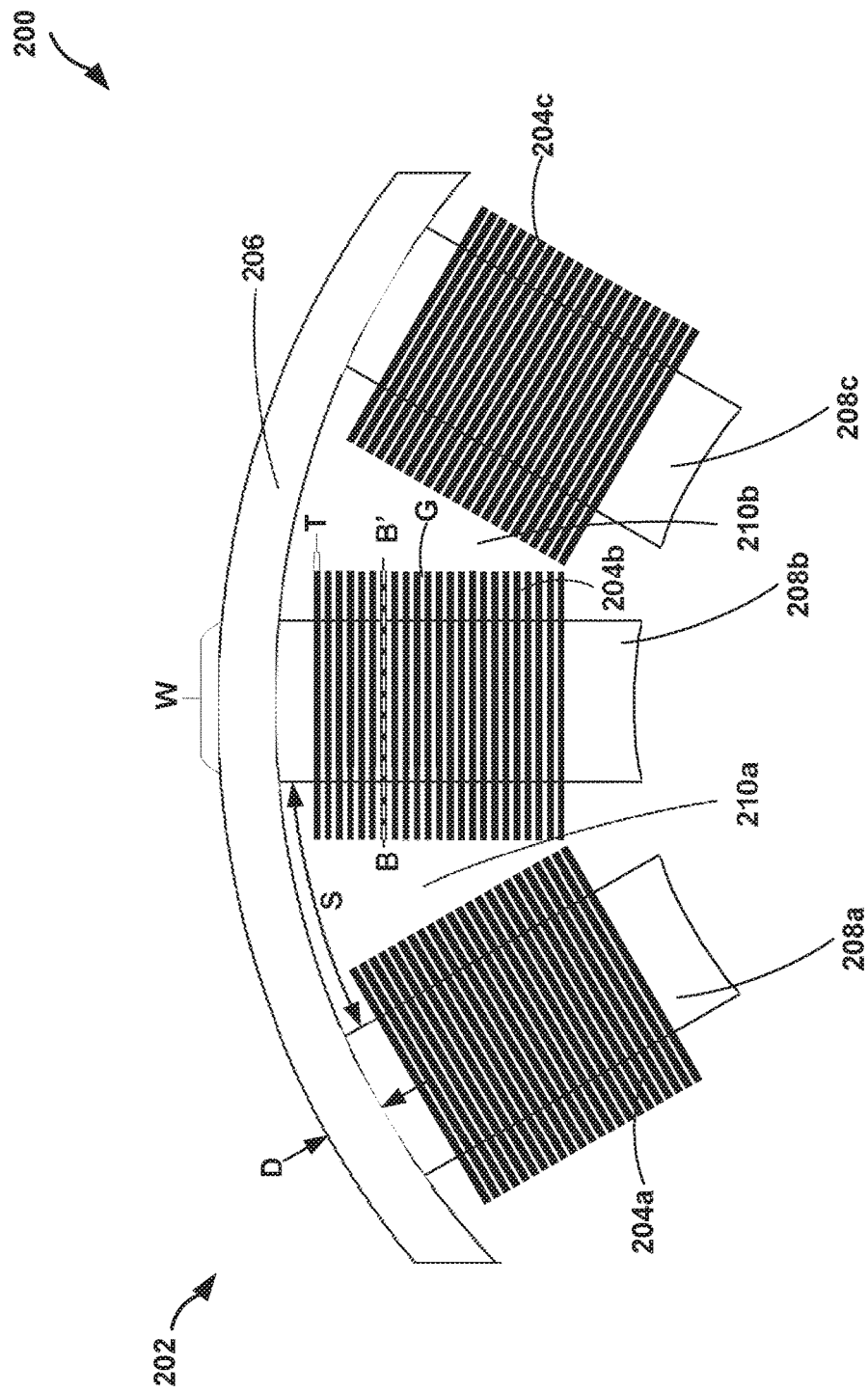
FIG. 2 is a cross-sectional diagram illustrating a portion of an example stator body, in accordance with examples of the present disclosure.

FIG. 2 is a cross-sectional diagram illustrating a portion of an example stator body 200, in accordance with examples of the present disclosure. In the example shown in FIG. 2, stator body 200 illustrates a view of a cross-section of a portion of stator body 112a taken along the line A-A' as shown in FIG. 1.

In the example shown, stator body 200 includes stator stack 202, which includes base portion 206 and a plurality of stator teeth 208a, 208b, 208c (collectively, stator teeth 208) extending radially inwards, e.g., in the z-direction for stator tooth 208b, from base portion 206 towards the longitudinal axis of a rotor (not shown). In the example shown, base portion 206 may comprise a ring in the circumferential direction about the longitudinal axis of the rotor and may be attached to an outer housing of the stator or may comprise at least a portion of an outer housing of the stator. Base portion 206 may have a thickness D in the radial direction, and a length L in the longitudinal direction, e.g., a length L as illustrated in FIG. 1.

In the example shown, stator stack 202 includes a plurality of stator teeth 208 disposed on base portion 206 and spaced from each other circumferentially around the longitudinal axis. Stator teeth 208 may have a circumferential width W and a spacing S between stator teeth 208 in the circumferential direction, and the spacing S may vary as a function of radial position along stator teeth 208 in the radial direction. In general, the number and width W of stator teeth 208 are designed in conjunction with the rotor magnets, or electromagnets, for tight magnetic coupling between the stator and the rotor. Stator teeth 208 may have a longitudinal length L that is substantially similar to the length L of base portion 206. In some examples, stator teeth 208 may have a longitudinal length L that is less than or greater than base portion 206 and may have longitudinal lengths that are different from each other. Stator teeth 208 may have a height extending radially towards the longitudinal axis of the rotor and defined by the diameters of stator stack 202, the rotor, and a stator-to-rotor radial gap 116 (illustrated in FIG. 1) between the rotor and stator teeth 208. In general, stator teeth 208 may be configured to extend as closely as possible to an outer perimeter of the rotor while maintaining a sufficient stator-to-rotor gap 116 for efficient rotation of the rotor.

In some examples, stator stack 202 may be formed as a lamination stack of base portion 206 and stator teeth 208. For example, base portion 206, alternatively referred to as a back iron, may be comprised of steel and/or iron and be punched or laser cut from steel and/or iron sheets. In some examples, stator teeth 208 may be comprised of a ferromagnetic material and may be punched or laser cut. In some examples, stator teeth 208 may be comprised of ferromagnetic steel. Stator stack 202 may be formed by lamination of stator teeth 208 to base portion 206 and/or welding of stator teeth 208 to base portion 206 and may be referred to as the lamination stack. In the example shown, the spacing S, longitudinal length L, and radial height of stator teeth 208 may define stator slots 210a, 210b, collectively stator slots 210, e.g., the volume of space between adjacent stator teeth 208.

In the example shown, stator body 200 includes a plurality of windings 204a, 204b, 204c, collectively stator windings 204, wound around each of stator teeth 208. Each of windings 204 may be comprised of respective electrically conductive members each having a continuous length wound around respective stator teeth 208 a number of times. For example, winding 204a may be comprised of an electrically conductive member wound about stator tooth 208a with N turns where N is a positive number and a turn is one full time around stator tooth 208a. In some examples, each of windings 204 may be comprised of respective electrically conductive members each having a plurality of segments electrically connected to each other and having N turns about corresponding stator teeth 208. In some examples, the N turns of each of windings 204 are substantially along the entire radial height of stator teeth 208. In other examples, the N turns of each of windings 204 are along less than the entire radial height of stator teeth 208. The electrically conductive members comprising each of windings 204 may be comprised of any suitable conductor, e.g., copper, aluminum, silver, and the like. In the example shown, the electrically conductive members of windings 204 have a thickness T in the radial direction. For example, the thickness T of the electrically conductive member is the thickness at a particular turn along the radial direction, as opposed to the thickness in the radial direction of the entire winding. In the example shown, each turn of the electrically conductive member in the radial direction has the same thickness T. In other examples, e.g., such as those illustrated in FIGS. 9-11, the thickness of each turn of the electrically conductive member in the radial direction may differ.

In the example shown, windings 204 have a gap G between each of the plurality of turns. For example, winding 204b may have a gap of a distance G between the respective facing surfaces of the $N^{th}$ turn and the $N^{th}+1$ turn of the electrically conductive member. In the example shown, the gap G is the same for every turn of winding 204b. In other examples, the gap G may differ along the radial direction of winding 204b. In some examples, the volume between neighboring turns of the electrically conductive member defined by the length, width (e.g., Lc and Wc illustrated in FIG. 3A below) and gap G may be filled with an electrically insulating material. In other examples, the volume may be left unfilled, e.g., the gap volume between turns may be an air gap.

In some examples, the gap G is large enough to prevent arcing and/or shorting between neighboring turns, either across the air gap or through a gap-filling insulator. The gap G between each of the plurality of turns of winding 204 may define a breakdown voltage between neighboring turns. For example, for a voltage V applied to the conductive member of winding 204b, there may be a voltage difference ΔV between neighboring turns. The breakdown voltage may be the minimum voltage that causes a portion of an insulator, either as a solid or a gas such as air, to become electrically conductive, and an arc through and/or across the insulator between neighboring turns may occur if ΔV is near or greater than the minimum voltage, e.g., the breakdown voltage. In some examples, the gap G defines a breakdown voltage that is at least double the maximum voltage to be applied to the conductive members of windings 204. In some examples, the gap G defines a breakdown voltage that is at least ten times the maximum voltage to be applied to the conductive members of windings 204. In some examples, the voltage to be applied to the conductive members is relatively low, and the volume between neighboring turns, and therefore the amount of air and/or insulating material between neighboring turns, may be relatively reduced. In some examples, the voltage applied to a conductive member may be distributed substantially evenly to every turn of the winding. In some examples, the voltage applied may be from about 28V to about 540V, and the number of turns may be from 2 to 200. In some examples, the voltage applied may be greater than 540V or less than 24V, and in some examples the number of turns may be 1 or greater than 200. The reduction of insulating material and/or gas, e.g., the reduction of gap G, may enable a fill factor of greater than 40%, greater than 45%, or greater than 50%.

In some examples, high voltage insulation may be needed only between windings 204 and stator teeth 208 and between windings 204 and base portion 206. For example, because there may be N turns relatively close to stator teeth 208 and no voltage is applied to base portion 206 and/or stator teeth 208, ΔV between the windings 204 and stator teeth 208 and base portion 206 may be significantly larger than a ΔV between neighboring turns, and a high voltage insulator may be used between windings 204 and one or both of stator teeth 208 and base portion 206.

In some examples stator body 200 may be in thermal and/or mechanical contact with a housing of electric machine 100. For example, stator body 200 may be attached to a stator housing, which in turn is attached to a housing of electric machine 100. In some examples, electric machine 100 may include cooling media, e.g., a heat sink. Stator body 200 may be in thermal contact with the cooling media, for example, via thermal contact with one or more housings ultimately in thermal contact with the thermal media. In some examples, heat removal from windings 204 may be improved via every turn of windings 204 being in thermal interaction with the cooling media via thermal contact with insultation that is in thermal contact with stator teeth 208. In other words, a thermal impedance from windings 204 to the housing and cooling media may be reduced by forming windings 204 such that substantially all of the N turns are in thermal contact with stator teeth 208 via insulation, as opposed to a multi-layer conductive member in which only the "inner" turns would be in direct contact with insulation that is in contact with stator teeth 208. In some examples, the thermal impedance may be reduced by a factor of 2 or greater.

Figure 3B:
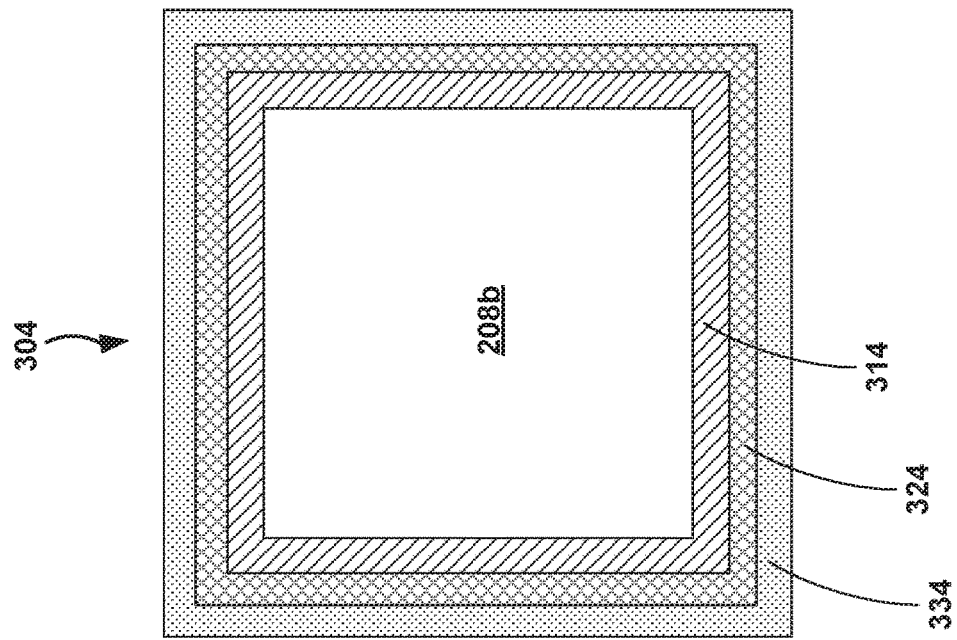
FIG. 3B illustrates a view of a cross-section of a stator tooth and a multi-layer winding.
Figure 3A:
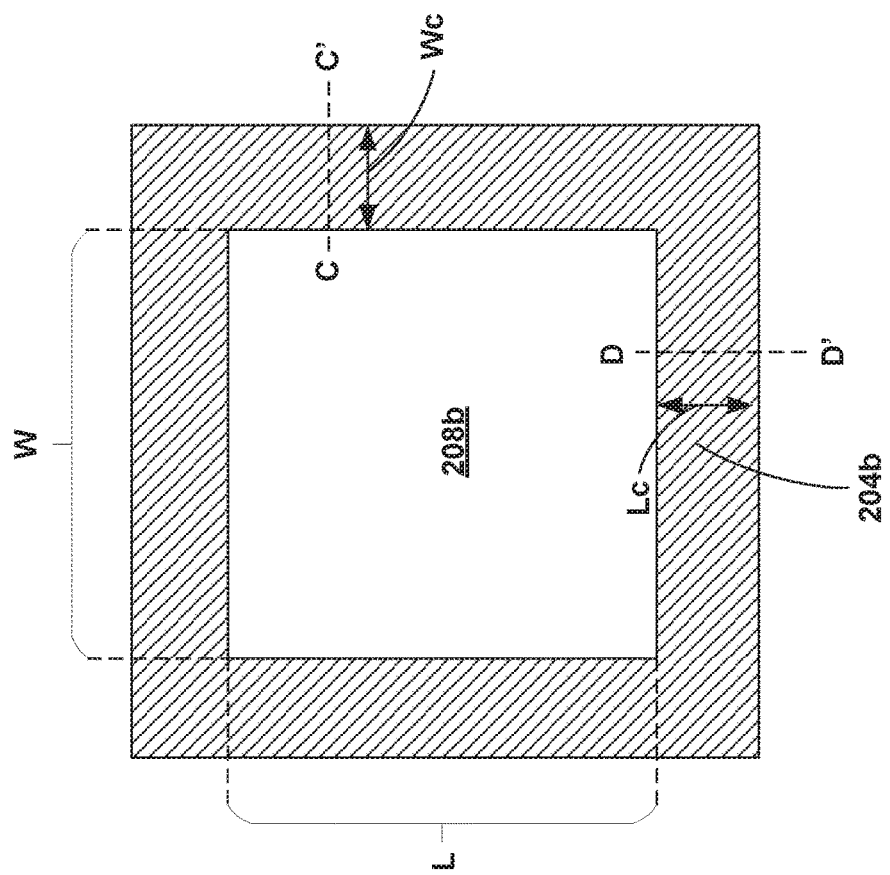
FIG. 3A illustrates a view of a cross-section of a stator tooth and a single turn of a single-layer winding, in accordance with examples of the present disclosure.

In the example shown, each of windings 204 include a single layer of electrically conductive member, as illustrated in FIG. 3A. FIG. 3A is a cross-sectional diagram illustrating an example stator tooth 208b and a single turn of a single-layer winding 204b, in accordance with examples of the present disclosure. FIG. 3A illustrates a view of a cross-section of stator tooth 208b and winding 204b taken along the line B-B' as shown in FIG. 2, e.g., looking down the radial direction. By way of contrast for illustrative purposes, FIG. 3B illustrates a view of a cross-section of stator tooth 208b and a multi-layer winding 304. In the example shown in FIG. 3B, multi-layer winding 304 includes a first layer 314 adjacent stator tooth 208b, a second layer 324 wound around the outside perimeter of first layer 314, and a third layer 334 wound around the outside perimeter of second layer 324. The multiple layers 314-334 of winding 304 may include insulators between each layer to prevent electrical shorting between the layers. In examples in accordance with this disclosure, each of windings 204 comprise a single-layer electrically conductive member having N turns about a stator tooth 208, such as winding 204b about stator tooth 208B illustrated in FIG. 3A. In other words, windings 204 do not include layers 324 and 334. In some examples, the width of the electrically conductive member of single-layer winding 204b in the longitudinal and circumferential directions extending perpendicularly from stator tooth 208b, e.g., in the x-y plane, may be comparatively increased so as to encompass the total width of the multiple layers illustrated in FIG. 3B. In some examples, the width Wc and width Lc of each turn of the electrically conductive member of winding 204b extending substantially perpendicularly from stator tooth 208b, e.g., perpendicular to the radial direction along the z-direction as illustrated, may be substantially greater than its thickness T in the radial direction. In other words, both Wc and Lc may be referred to as a "width" of the electrically conductive member of windings 204 in a direction perpendicular to the radial direction at a particular one of the N turns, e.g., in the plane perpendicular to the radial direction at the $i^{th}$ turn, where i is a number between 1 to N. In some examples, the electrically conductive member of each of windings 204 may have a thickness T in the radial direction that is less than its width in a direction perpendicular to the radial direction, e.g., Wc and/or Lc. In some examples, the ratio of the width Wc and/or Lc of the electrically conductive member of each of windings 204 to its thickness T is at least 2:1. In some examples, the ratio of the width Wc and/or Lc of the electrically conductive member of each of windings 204 to its thickness T is at least 10:1. In some examples, the ratio of the width Wc and/or Lc to the thickness T of the electrically conductive member is at least 100:1.

Returning now to FIG. 2, in some examples the plurality of N turns of each of windings 204 are substantially identical, e.g., have the same thickness T in the radial direction and width Wc and/or Lc in a direction perpendicular to the radial direction. In some examples, a voltage applied to the electrically conductive member of windings 204 may be comparatively less than conventional multiple-layer wire or bus bar windings. Correspondingly, windings 204 may including insulation between neighboring turns of the respective electrically conductive members that is comparatively less than conventional multiple-layer windings. Windings 204 may include turns that prevent contact between non-neighboring turns, such as those that may occur with multi-layer windings. Windings 204 may include turns that prevent closeness between non-neighboring turns, e.g., windings 204 may prevent proximity between non-neighboring turns necessitating electrical insulation to prevent shorting or discharge between closely spaced conductors. In other words, windings 204 may include turns requiring insulation only between neighboring turns. In other examples, winding 204 may include a gap between neighboring turns that does not require insulation, e.g., the gap is sufficient to prevent arcing and/or shorting between neighboring turns given the maximum voltage to be applied to the respective electrically conductive members of windings 204, as discussed above.

In some examples, windings 204 may be configured to have a slot fill factor of about 50%. For example, slot fill factor may be defined as the proportion of the volume of slot 210 filled with electrically conductive members of windings 204. For example, the slot fill factor between stator teeth 208a and 208b is the amount of gap 210a that is occupied by at least of portion of windings 204a and 204b. In some examples, windings 204 may be configured to result in a slot fill factor of greater than about 40%, greater than about 45%, or greater than about 50%.

Figure 4:
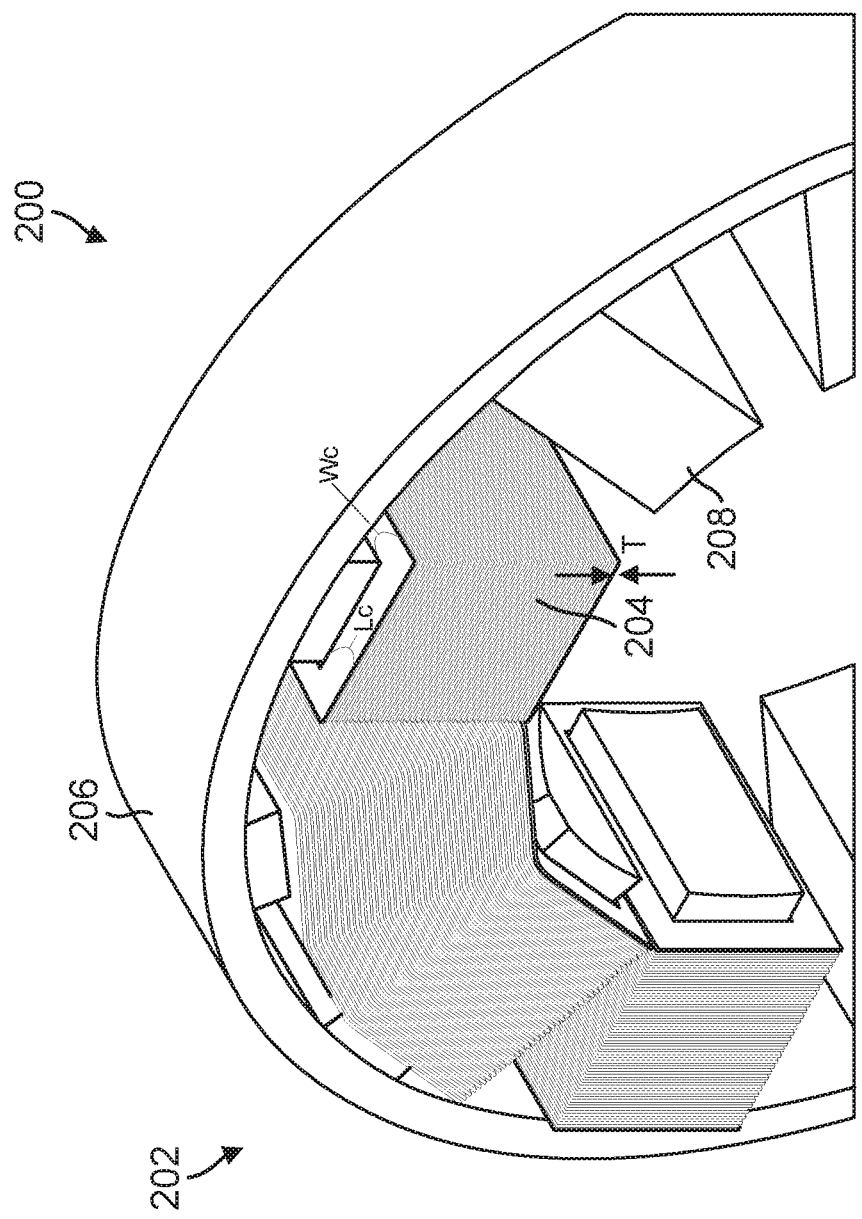
FIG. 4 is a perspective view of a portion of an example stator body, in accordance with examples of the present disclosure.

FIG. 4 is a perspective view of a portion of an example stator body 200, in accordance with examples of the present disclosure. In the example shown, stator body 200 includes stator stack 202 and single-layer windings 204. Stator stack 202 includes base portion 206 and stator teeth 208. The example shown in FIG. 4 provides a further perspective view of stator body 200. In the example shown, some of stator teeth 208 are shown without corresponding windings 204 for purposes of illustration, but in practice all of stator teeth 208 would be wound with corresponding windings 204.

In the example shown, a thickness T in the radial direction of the electrically conductive member of winding 204 may be significantly smaller than its width Wc and/or Lc in a direction substantially perpendicular to the radial direction, as discussed above with respect to FIG. 2. For example, the thickness T of each turn of the electrically conductive member illustrated in FIG. 2 may be less (e.g., significantly less) than the width Lc and/or width Wc of the electrically conductive member as illustrated in FIG. 3A. In other words, both Lc and Wc are a width of the electrically conductive member in a direction substantially perpendicular to the radial direction. In some examples, a desired number of turns with a single-layer electrically conductive member is achieved via forming the thickness T of the electrically conductive member to be significantly less than its width Wc and/or Lc in a direction substantially perpendicular to the radial direction.

Figure 13A:
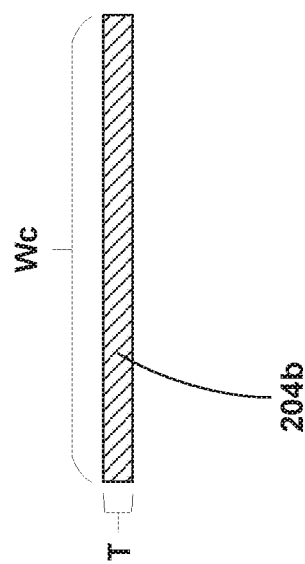
FIG. 13A illustrates a view of a cross-section of an example conductive member of a single-layer winding, in accordance with examples of the present disclosure.
Figure 13A:
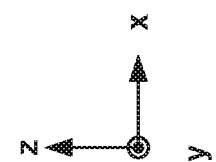
Figure 13B:
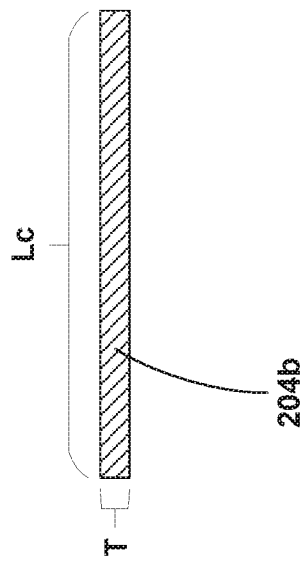
FIG. 13B illustrates a view of another cross-section of an example conductive member of a single-layer winding, in accordance with examples of the present disclosure.
Figure 13B:
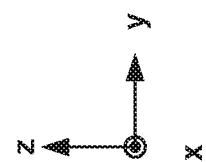

In some examples, the cross-sectional shape of the electrically conductive member is substantially rectangular. For example, the cross-sectional shape of the electrically conductive member of winding 204b taken along the line C-C', as illustrated in FIG. 13A, is substantially rectangular having a thickness T in the radial direction and width Wc in the circumferential direction. The cross-sectional shape of the electrically conductive member of winding 204b taken along the line D-D', as illustrated in FIG. 13B is substantially rectangular having a thickness T in the radial direction and width Lc in the longitudinal direction.

Figure 5:
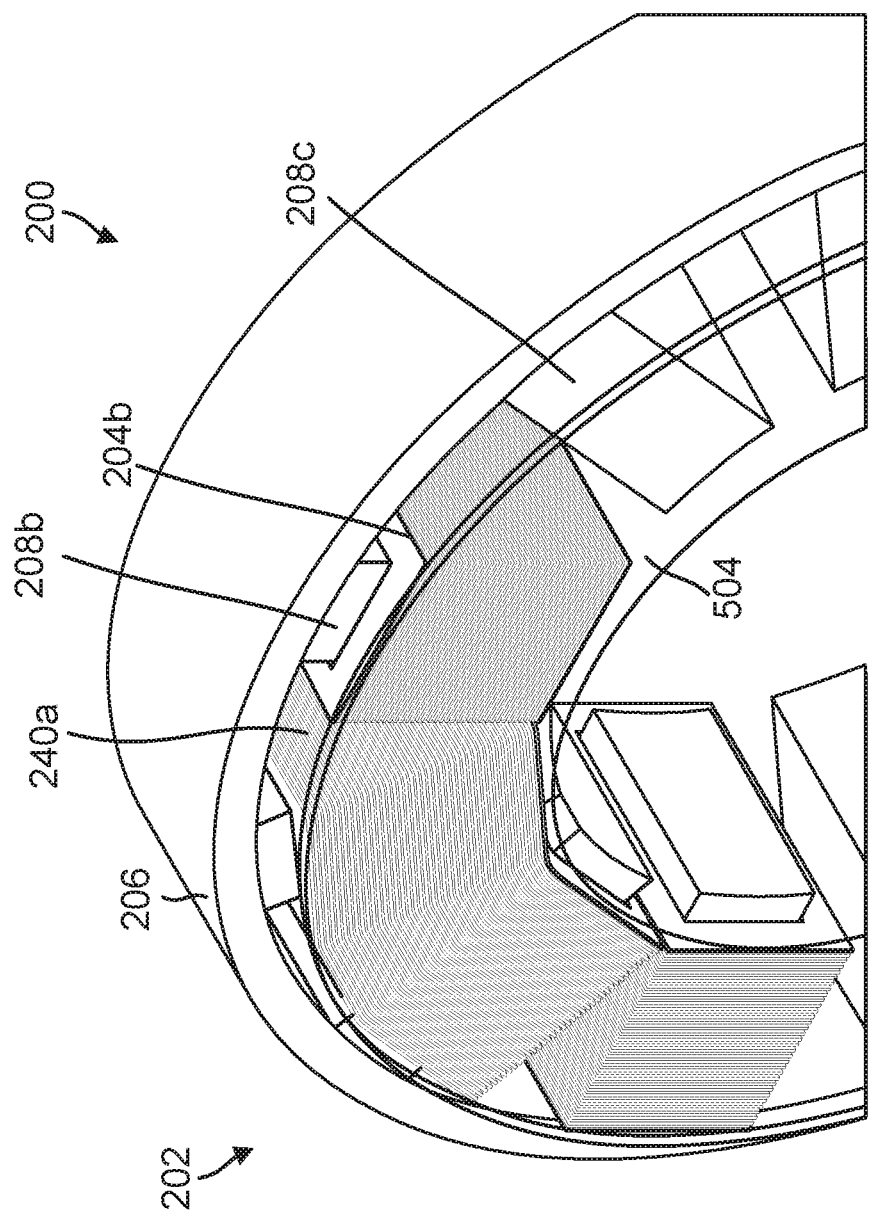
FIG. 5 is a perspective view of a portion of an example stator body including a thermally conductive member, in accordance with examples of the present disclosure.

FIG. 5 is a perspective view of a portion of an example stator body 200, e.g., as shown in FIG. 4, but also including a thermally conductive member 504, in accordance with examples of the present disclosure. In the example shown, thermally conductive member 504 is in thermal contact with one or more of the electrically conductive members of one or more windings 204 at a longitudinal end of stator body 200. In some examples, stator body 200 may include a thermally conductive member 504 in thermal contact with one or more of the electrically conductive members of one or more windings 204 at both longitudinal ends of stator body 200.

In some examples, windings 204 may directly transfer heat to cooling media in thermal contact with a housing of electric machine 100 and/or an end bell in thermal contact with thermally conductive member 504, e.g., end bell 608 illustrated in FIG. 6 below. In some examples, thermally conductive member 504 may be made of fiberglass and silicone rubber, e.g., such as a material the same or substantially similar to a SIL PAD available from Henkel, Dusseldorf, DE. For example, thermally conductive member 504 may reduce a thermal impedance between windings 204 and a housing and/or an end bell, which may be in thermal contact with cooling media, e.g., a heat sink. In some examples, the thermal impedance between windings 204 and a housing of electric machine 100 and/or an end bell may be less than half, less than one third, or less than one tenth of the thermal impedance between windings 204 and stator teeth 208 and/or base portion 206. In some examples, thermally conductive member 504 may be in thermal contact with the entire radial length of windings 204. In the example shown, thermally conductive member 504 is substantially disk-shaped and in thermal contact with the entire radial length of windings 204. In some examples, thermally conductive member 504 may distribute the heat load of windings 204 evenly at the longitudinal end of stator body 200 and may reduce temperature gradients of windings 204. In some examples, windings 204 may directly transfer 50% or more of their total heat, 60% or more of their total heat, or 70% or more of their total heat to the housing of electric machine 100 via thermally conductive member 504. In some examples, thermally conductive member 504 must be an electrical insulator. In some examples, thermally conductive member 504 may reduce the complexity of design, manufacture, and installation of stator body 200.

Figure 6:
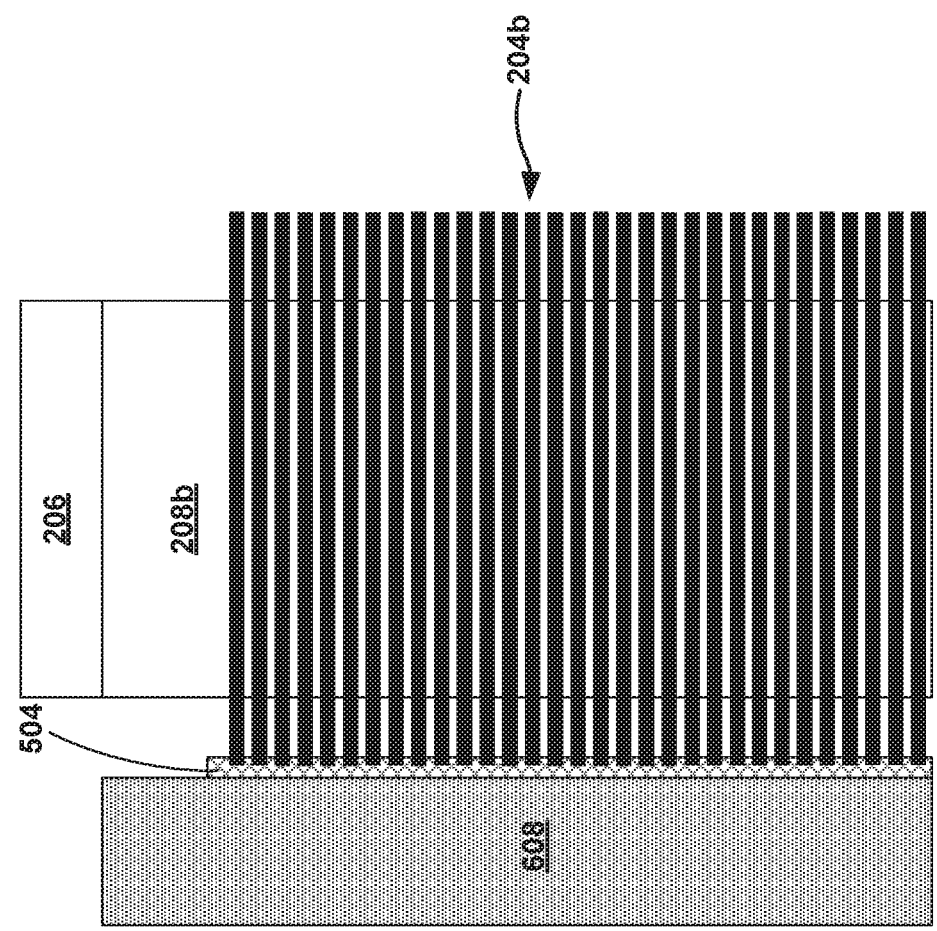
FIG. 6 is a cross-sectional diagram illustrating a portion of an example stator body including an end bell, in accordance with examples of the present disclosure.

FIG. 6 is a cross-sectional diagram illustrating a portion of an example stator body 200 including an end bell 608, in accordance with examples of the present disclosure. In the example shown, stator body 200 includes stator tooth 208, winding 204 in thermal contact with thermally conductive member 504, and end bell 608 in thermal contact with thermally conductive member 504. The example shown in FIG. 6 provides a further perspective view of stator body 200.

Figure 7:
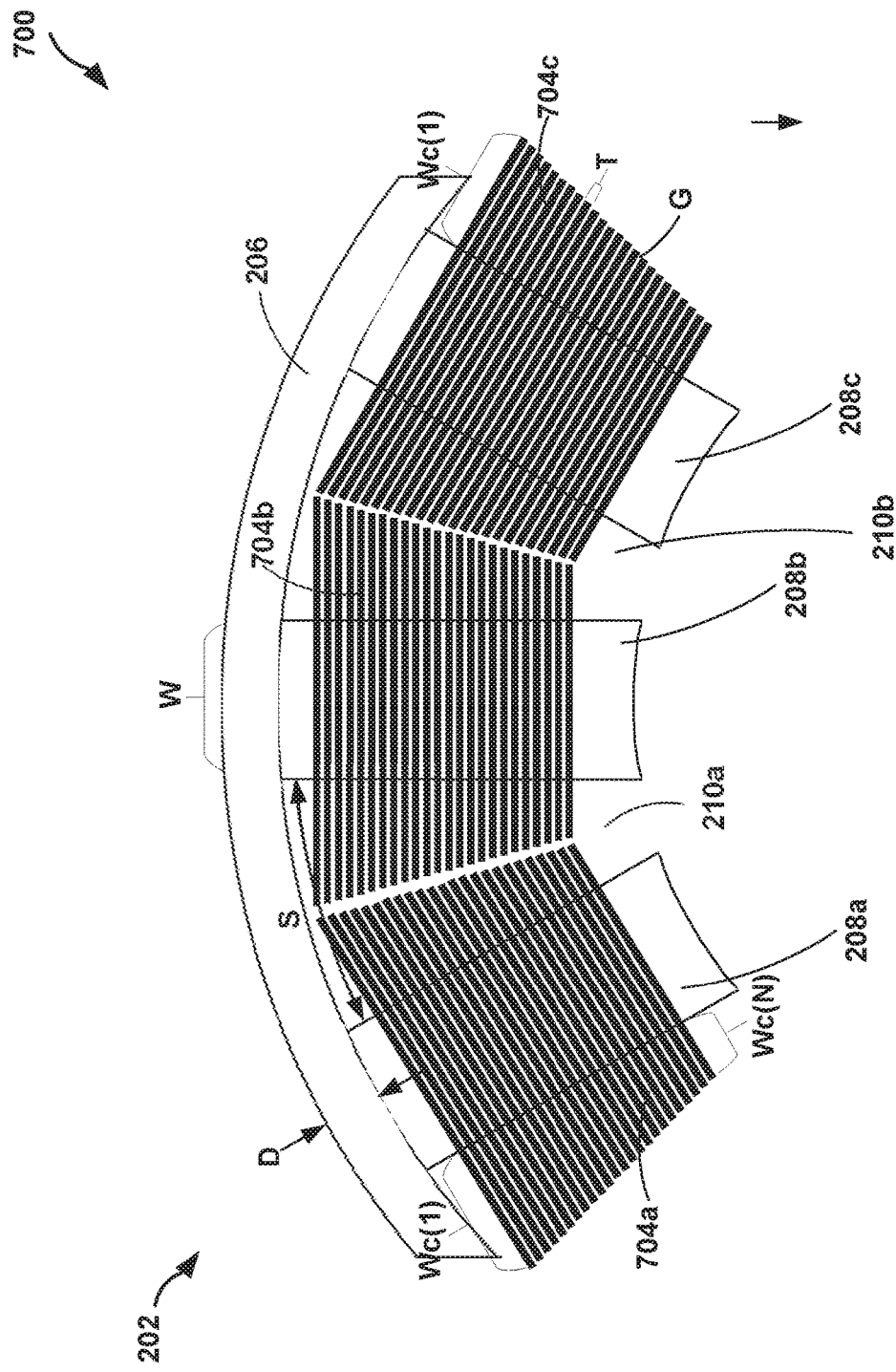
FIG. 7 is a cross-sectional diagram illustrating a portion of an example stator body, in accordance with examples of the present disclosure.

FIG. 7 is a cross-sectional diagram illustrating a portion of an example stator body 700, in accordance with examples of the present disclosure. In the example shown in FIG. 7, stator body 700 illustrates a view of a cross-section of a portion of stator body 112a taken along the line A-A' as shown in FIG. 1. In some examples, stator body 700 is substantially similar to stator body 200 illustrated and described above, except that stator body 700 includes windings 704 which have a variable width (e.g., Wc) in the circumferential direction.

In the example shown, stator body 700 includes stator stack 202, which includes base portion 206 and a plurality of stator teeth 208a, 208b, 208c (collectively, stator teeth 208) extending radially inwards, e.g., in the z-direction for stator tooth 208b, from base portion 206 towards the longitudinal axis of a rotor (not shown). In the example shown, base portion 206 may comprise a ring in the circumferential direction about the longitudinal axis of the rotor and may be attached to an outer housing of the stator or may comprise at least a portion of an outer housing of the stator. Base portion 206 may have a thickness D in the radial direction, and a length L in the longitudinal direction, e.g., a length L as illustrated in FIG. 1.

In the example shown, stator body 700 includes a plurality of windings 704a, 704b, 704c, collectively stator windings 704, wound around each of stator teeth 208. In some examples, windings 704 may be substantially similar to windings 204 illustrated and described above, except that windings 704 may have a variable width Wc in the circumferential direction. Each of windings 704 may be comprised of respective electrically conductive members each having a continuous length wound around respective stator teeth 208 a number of times. For example, winding 704a may be comprised of an electrically conductive member wound about stator tooth 208a with N turns where N is a positive number and a turn is one full time around stator tooth 208a. In some examples, each of windings 704 may be comprised of respective electrically conductive members each having a plurality of segments electrically connected to each other and having N turns about corresponding stator teeth 208. In some examples, the N turns of each of windings 704 are substantially along the entire radial height of stator teeth 208. In other examples, the N turns of each of windings 704 are along less than the entire radial height of stator teeth 208. The electrically conductive members comprising each of windings 704 may be comprised of any suitable conductor, e.g., copper, aluminum, silver, and the like. In the example shown, the electrically conductive members of windings 704 have a thickness T in the radial direction. For example, the thickness of the electrically conductive member is the thickness at a particular turn along the radial direction, as opposed to the thickness in the radial direction of the entire winding. In the example shown, each turn of the electrically conductive member in the radial direction has the same thickness T. In other examples, e.g., such as those illustrated in FIGS. 9-11, the thickness of each turn of the electrically conductive member in the radial direction may differ.

In the example shown, the conductive members of windings 704 has a width in the circumferential direction, e.g., Wc as illustrated in FIG. 3A, that varies. In some examples, the width Wc is different for each turn of windings 704. In the example shown, the width Wc of each of the plurality of N turns of the conductive members of windings 704 increases in the circumferential direction as a function of increasing radial position from the distal portion of stator teeth 208 closest rotor 104 to the proximal portion of stator teeth 208 closest to base portion 206. For example, the electrically conductive member (or members) of winding 704a may have a width Wc(1) in the radial direction for a first turn at the proximal portion of stator tooth 208a near base 206 that is different, e.g., wider/larger than the width Wc(N) of the Nth turn of winding 704a at the distal portion of the stator tooth 208a. In the example shown, the thickness T of each turn of the conductive members of the respective windings 704 are substantially the same, and the increasing width Wc as a function of radial position and/or turn is such that stator slots 210a, 210b, collectively stator slots 210, are substantially filled. For example, windings 704 may be configured to have a slot fill factor of 80% or greater, 85% or greater, or 90% or greater.

In the example shown, each of windings 704 has a gap G between each of the plurality of turns that may be substantially the same as gap G illustrated and described above with reference to FIG. 2. Similar to windings 204 described above, the voltage to be applied to the conductive members of windings 704 may be relatively low, and the volume between neighboring turns, and therefore the amount of air and/or insulating material between neighboring turns, may be relatively reduced. In some examples, the voltage applied to the conductive member of a winding 704 may be distributed substantially evenly to every turn of winding 704. In some examples, the voltage applied may be from about 28V to about 540V, and the number of turns may be from 2 to 200. In some examples, the voltage applied may be greater than 540V or less than 24V, and in some examples the number of turns may be 1 or greater than 200. The reduction of insulating material and/or gas, e.g., the reduction of gap G, in conjunction with a variable width Wc of windings 704 may enable a fill factor of greater than 75%, greater than 85%, or greater than 90%.

In some examples, stator body 700 may be in thermal and/or mechanical contact with a housing of electric machine 100, similar to stator body 200 illustrated and described above with reference to FIG. 2. In some examples, heat removal from windings 704 may be improved via every turn of windings 704 being in thermal communication with cooling media via thermal contact with insultation that is in thermal contact with stator teeth 208. In other words, a thermal impedance from windings 704 to the housing and cooling media may be reduced by forming windings 704 such that substantially all of the N turns are in thermal contact with stator teeth 208 via insulation, as opposed to a multi-layer conductive member in which only the "inner" turns would be in direct contact with insulation that is in contact with stator teeth 208. In some examples, the thermal impedance may be reduced by a factor of 2 or greater.

In some examples, stator body 700 may include a thermally conductive member 504 in thermal contact with one or more windings 704 at one or both longitudinal ends of stator body 700, similar to stator body 200 illustrated and described above with respect to FIGS. 5-6. In some examples, stator body 700 may include an end bell 608 in thermal contact with thermally conductive member 504 at one or both longitudinal ends of stator body 700, similar to stator body 200 illustrated and described above with respect to FIGS. 5-6.

Figure 8:
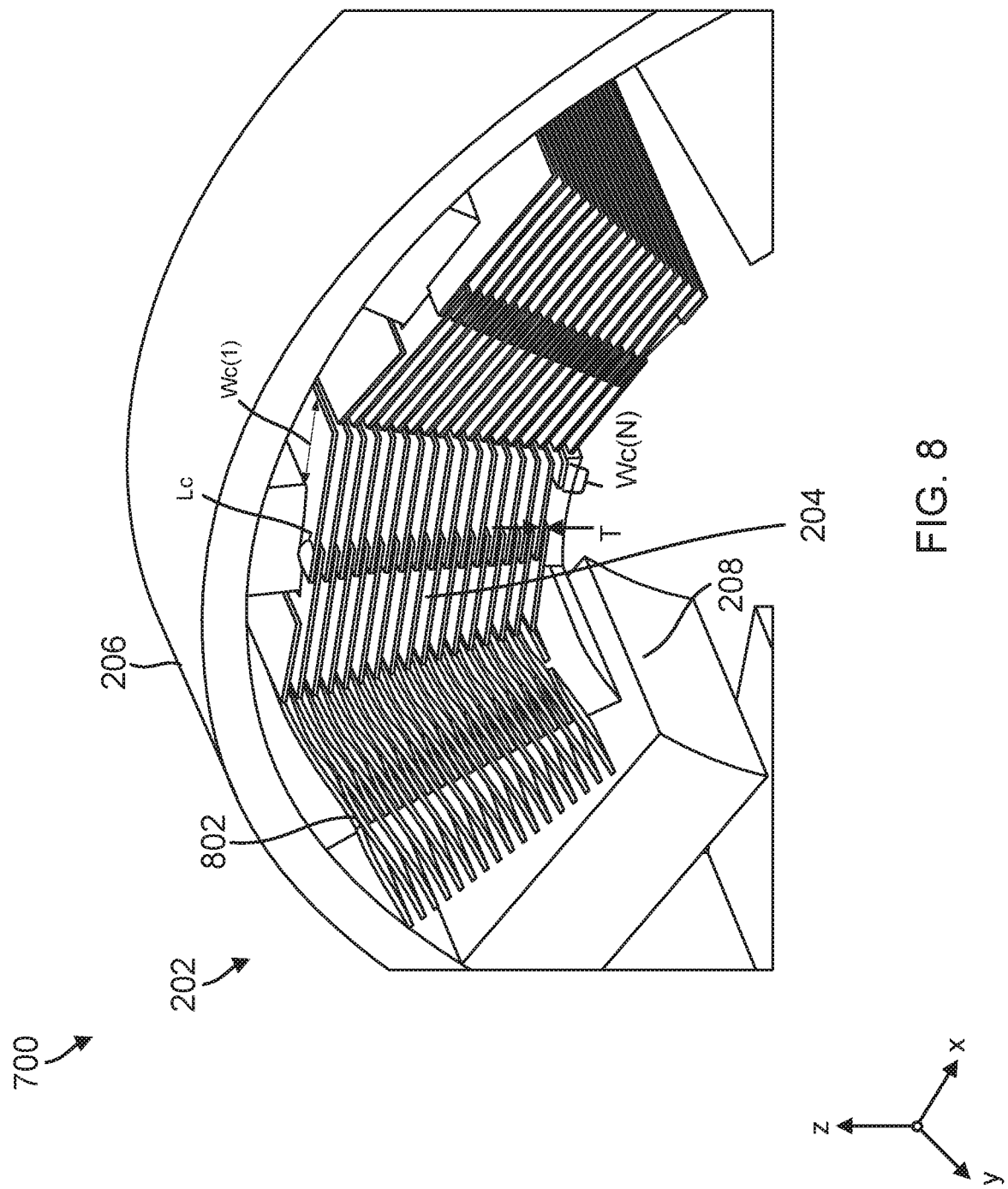
FIG. 8 is a perspective view of a portion of an example stator body, in accordance with examples of the present disclosure.

FIG. 8 is a perspective view of a portion of an example stator body 700, in accordance with examples of the present disclosure. In the example shown, stator body 700 includes stator stack 202 and single-layer windings 704. Stator stack 202 includes base portion 206 and stator teeth 208. The example shown in FIG. 8 provides a further perspective view of stator body 700.

In the example shown, and similar to stator body 200 illustrated and described above with reference to FIG. 2, a thickness T in the radial direction of the electrically conductive members of windings 704 may be significantly smaller than its width Wc and/or Lc in a direction substantially perpendicular to the radial direction. In some examples, a desired number of turns with a single-layer electrically conductive member of a winding 704 may be achieved via forming the thickness T of the electrically conductive member to be significantly less than its width Wc and/or Lc in a direction substantially perpendicular to the radial direction.

In some examples, the windings may comprise a plurality segmented electrically conductive members. In the example shown in FIG. 8, winding 204 may comprise a plurality of electrically conductive member segments wherein each segment comprises one of the N turns and are electrically connected and/or joined to each other in series, e.g., with a plurality of lap joints 802 such that a segment forming a particular turn is connected to the two segments of its neighboring turns (the one "above" it and "below" it, as shown). In some examples, winding 204 may comprise a plurality of U-shaped or C-shaped electrically conductive member segments, e.g., each segment comprising substantially one half of a turn of winding 204 and electrically connected and/or joined to each other in series. In other examples, winding 204 may comprise a plurality of any type shape electrically conductive member segment comprising any amount of a partial turn or amount greater than a single turn and electrically connected and/or joined in series. In other examples, each winding 204 may comprise a single electrically conductive member having a continuous length wound around a stator teeth 208.

In some examples, the cross-sectional shape of the electrically conductive members of windings 704 may be substantially rectangular. For example, the cross-sectional shape of the electrically conductive member of winding 704b, similar to the cross-sectional shape of winding 204b taken along the line C-C' illustrated in FIG. 13A, may be substantially rectangular having a thickness T in the radial direction and width Wc in the circumferential direction. The cross-sectional shape of the electrically conductive member of winding 704b, similar to the cross-sectional shape of winding 204b taken along the line D-D' illustrated in FIG. 13B, may be substantially rectangular having a thickness T in the radial direction and width Lc in the longitudinal direction.

In the example shown, some of stator teeth 208 are shown without corresponding windings 204 for purposes of illustration, but in practice all of stator teeth 208 would be wound with corresponding windings 204.

Figure 9:
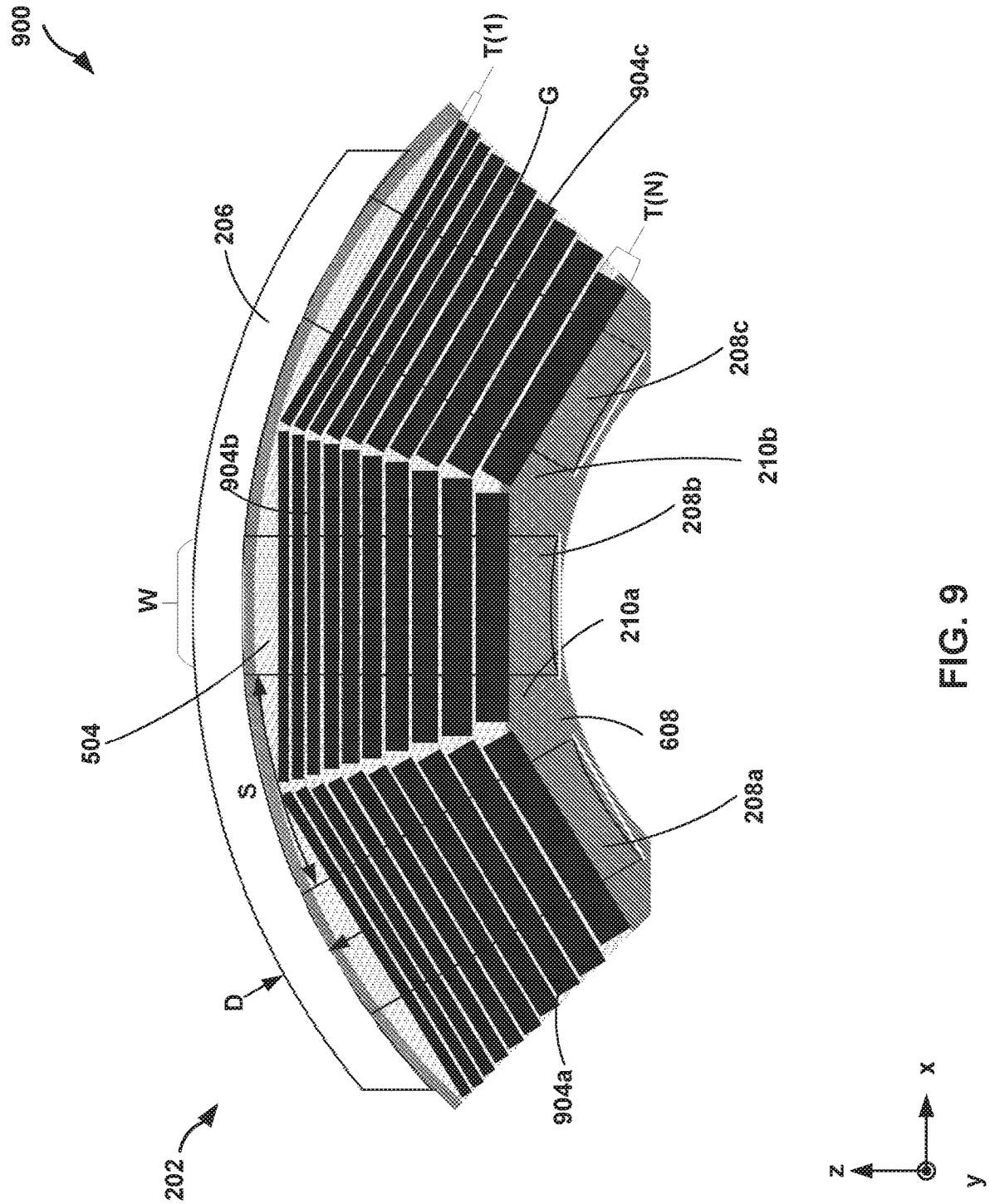
FIG. 9 is a perspective view of another example stator body, in accordance with examples of the present disclosure.

FIG. 9 is a perspective view of another example stator body 900, in accordance with examples of the present disclosure. In the example shown in FIG. 9, stator body 900 illustrates a view of a cross-section of a portion of stator body 112a taken along the line A-A' as shown in FIG. 1. In some examples, stator body 900 is substantially similar to stator body 700 illustrated and described above, except that stator body 900 includes windings 904 which may have a variable thickness T in the radial direction.

In the example shown, stator body 900 includes stator stack 202, which includes base portion 206 and a plurality of stator teeth 208a, 208b, 208c (collectively, stator teeth 208) extending radially inwards, e.g., in the z-direction for stator tooth 208b, from base portion 206 towards the longitudinal axis of a rotor (not shown). In the example shown, base portion 206 may comprise a ring in the circumferential direction about the longitudinal axis of the rotor and may be attached to an outer housing of the stator or may comprise at least a portion of an outer housing of the stator. Base portion 206 may have a thickness D in the radial direction, and a length L in the longitudinal direction, e.g., a length L as illustrated in FIG. 1.

In the example shown, stator body 900 includes thermally conductive member 504 in thermal contact with one or more of the electrically conductive members of one or more windings 904 at the longitudinal end of stator body 900, e.g., the "far" longitudinal end "behind" stator stack 202. In the example shown, stator body 900 includes end bell 608 in thermal contact with thermally conductive member 504 at the longitudinal end of stator body 900, e.g., the "far"

longitudinal end "behind" stator stack 202 and thermally conductive member 504. In some examples, stator body 900 may include thermally conductive members in thermal contact with windings 904 at both longitudinal ends of stator body 900 and corresponding end bells in thermal contact with thermally conductive members 504 at both longitudinal ends of stator body 900.

In the example shown, stator body 900 includes a plurality of windings 904a, 904b, 904c, collectively stator windings 904, wound around each of stator teeth 208. In some examples, windings 904 may be substantially similar to windings 704 illustrated and described above, except that windings 904 may have a variable thickness T in the radial direction. Each of windings 904 may be comprised of respective electrically conductive members each having a continuous length wound around respective stator teeth 208 a number of times. For example, winding 904a may be comprised of an electrically conductive member wound about stator tooth 208a with N turns where N is a positive number and a turn is one full time around stator tooth 208a. In some examples, each of windings 904 may be comprised of respective electrically conductive members each having a plurality of segments electrically connected to each other and having N turns about corresponding stator teeth 208. In some examples, the N turns of each of windings 904 are substantially along the entire radial height of stator teeth 208. In other examples, the N turns of each of windings 904 are along less than the entire radial height of stator teeth 208. The electrically conductive members comprising each of windings 904 may be comprised of any suitable conductor, e.g., copper, aluminum, silver, and the like. In the example shown, the conductive members of windings 904 have a thickness T in the radial direction that varies. In some examples, the thickness T is different for each turn of windings 904. In the example shown, the thickness T of each of the plurality of N turns of the conductive members of windings 904 increases in the radial direction as a function of decreasing radial position from the proximal portion of stator teeth 208 closest to base portion 206 to the distal portion of stator teeth 208 closest rotor 104. For example, the electrically conductive member (or members) of winding 904a may have a thickness T(1) in the radial direction for a first turn at the proximal portion of stator tooth 208a near base 206 and a different thickness T(N) in the radial direction for Nth turn at the distal portion of the stator tooth 208a. In the example shown, windings 904 may be configured to have a slot fill factor of 80% or greater, 85% or greater, or 90% or greater. In some examples, a cross-sectional area of each of the plurality of turns at the longitudinal ends of windings 904, e.g., in the x-z plane, is substantially the same. In some examples, the constant cross-sectional area of each of the plurality of turns of windings 904 may produce a constant heat load along the entire longitudinal length of the windings 904 and may reduce thermal gradients.

In the example shown, each of windings 704 has a gap G between each of the plurality of turns that may be substantially the same as gap G illustrated and described above with reference to FIGS. 2 and 7. Similar to windings 204 and 704 described above, the voltage to be applied to the conductive members of windings 904 may be relatively low, and the volume between neighboring turns, and therefore the amount of air and/or insulating material between neighboring turns, may be relatively reduced. In some examples, the voltage applied to the conductive member of a winding 904 may be distributed substantially evenly to every turn of winding 904. In some examples, the voltage applied may be from about 28V to about 540V, and the number of turns may be from 2 to 200. In some examples, the voltage applied may be greater than 540V or less than 24V, and in some examples the number of turns may be 1 or greater than 200. The reduction of insulating material and/or gas, e.g., the reduction of gap G, in conjunction with a variable width We of windings 904 may enable a fill factor of greater than 75%, greater than 85%, or greater than 90%.

In some examples, stator body 900 may be in thermal and/or mechanical contact with a housing of electric machine 100, similar to stator bodies 200 and 700 illustrated and described above with reference to FIGS. 2 and 7. In some examples, heat removal from windings 904 may be improved via every turn of windings 904 being in thermal communication with cooling media via thermal contact with insulation that is in thermal contact with stator teeth 208. In other words, a thermal impedance from windings 904 to the housing and cooling media may be reduced by forming windings 904 such that substantially all of the N turns are in thermal contact with stator teeth 208 via insulation, as opposed to a multi-layer conductive member in which only the "inner" turns would be in direct contact with insulation that is in contact with stator teeth 208. In some examples, the thermal impedance may be reduced by a factor of 2 or greater.

Figure 10:
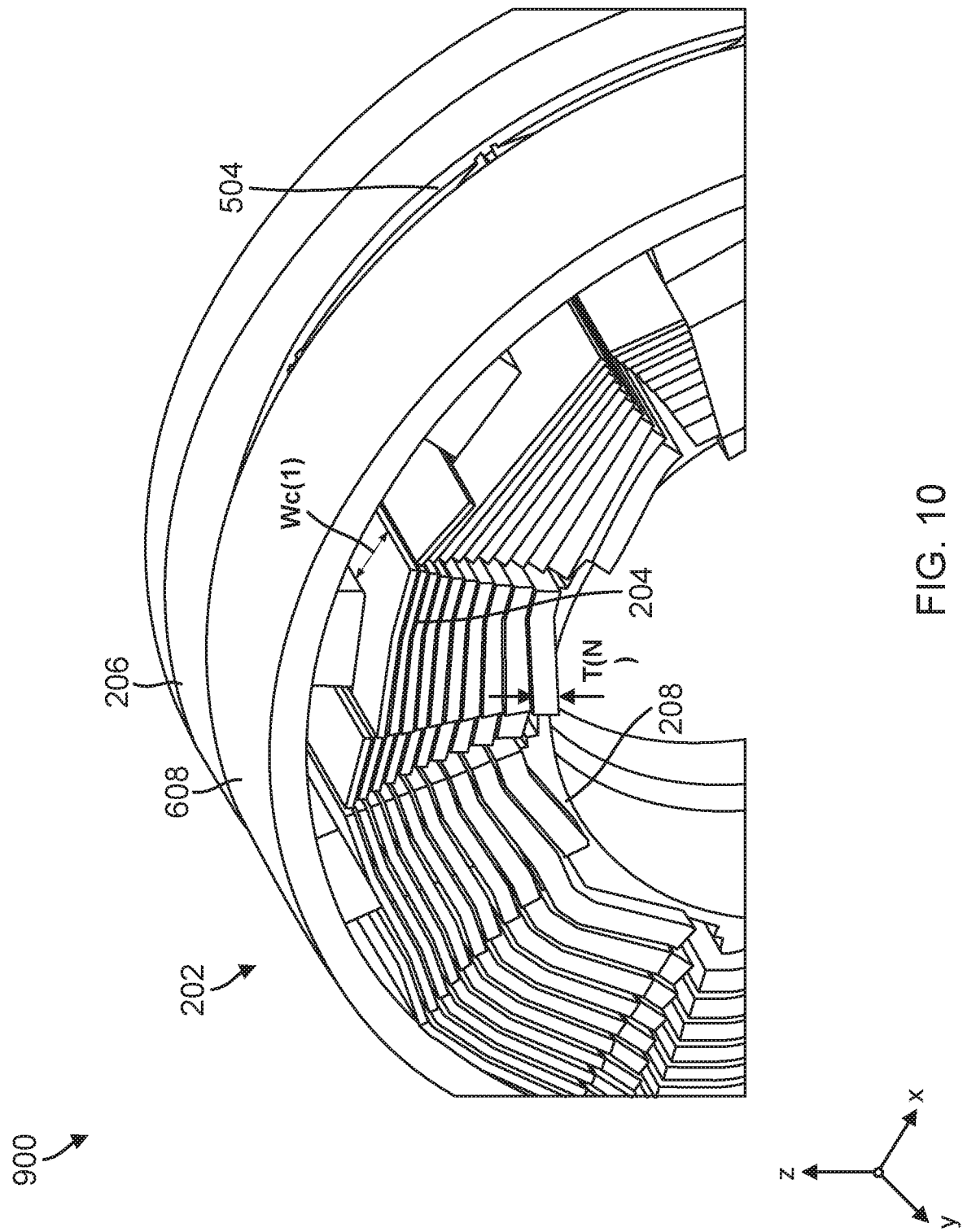
FIG. 10 is a perspective view of a portion of an example stator body, in accordance with examples of the present disclosure.

FIG. 10 is a perspective view of a portion of an example stator body 900, in accordance with examples of the present disclosure. In the example shown, stator body 900 includes stator teeth 208, windings 904 in thermal contact with thermally conductive member 504, and end bell 608 in thermal contact with thermally conductive member 504. The example shown in FIG. 10 provides a further perspective view of stator body 900.

Figure 11:
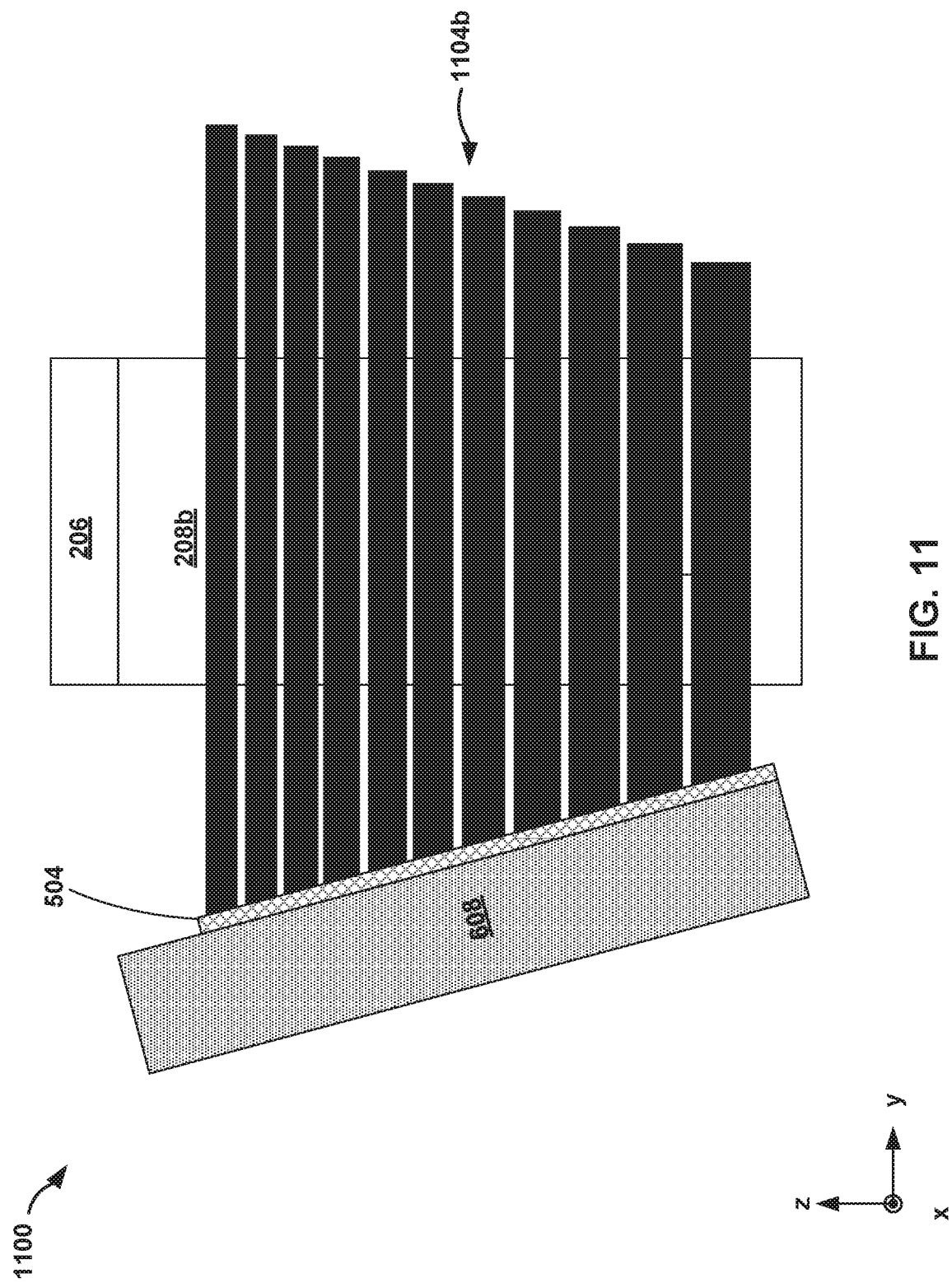
FIG. 11 is a cross-sectional diagram illustrating a portion of an example stator body, in accordance with examples of the present disclosure.

FIG. 11 is a cross-sectional diagram illustrating a portion of an example stator body 1100, in accordance with examples of the present disclosure. In the example shown, stator body 1100 includes stator stack 202, windings 1104 (only winding 1104b is shown), thermally conductive member 504 in thermal contact with the electrically conductive member of winding 1104b, and end bell 608 in thermal contact with thermally conductive member 504. In some examples, stator body 1100 is substantially similar to stator body 900 illustrated and described above, except that stator body 1100 includes windings 1104 which have a variable width in the longitudinal direction, e.g., Lc in the y-direction.

In the example shown, the conductive members of windings 1104 have a width in the longitudinal direction, e.g., Lc as illustrated in FIG. 3A, that varies. In some examples, the width Lc is different for each turn of windings 1104. In the example shown, the width Lc of each of the plurality of N turns of the conductive members of windings 1104 increases in the longitudinal direction as a function of increasing radial position from the distal portion of stator teeth 208 closest rotor 104 to the proximal portion of stator teeth 208 closest to base portion 206.

In the example shown, thermally conductive member 504 and end bell 608 may be "tilted," e.g., at an angle with respect to the z-axis and may be substantially cone shaped so as to contact each turn of windings 1104. In some examples, windings 1104 formed with a variable width in both the circumferential (Wc) and longitudinal (Lc) directions may reduce manufacturing complexity and costs of forming stator body 1100.

In some examples, the reduction of gap G and increase in the fill factor of stator bodies 200, 700, 900, and 1100 may enable reduction in the radial height of stator teeth 208 by 5% or more, 10% or more, or 20% or more. In some examples, stator bodies 200, 700, 900, and 1100 may enable a reduction of the diameter of stator body 200 by 5% or more, 10% or more, or 20% or more. In some examples, stator bodies 200, 700, 900, and 1100 may enable a weight reduction of 40% or more, a volume reduction of 40% or more, a cost reduction of 20% or more, and improvement of torque and power densities of 40% or more.

Figure 12:
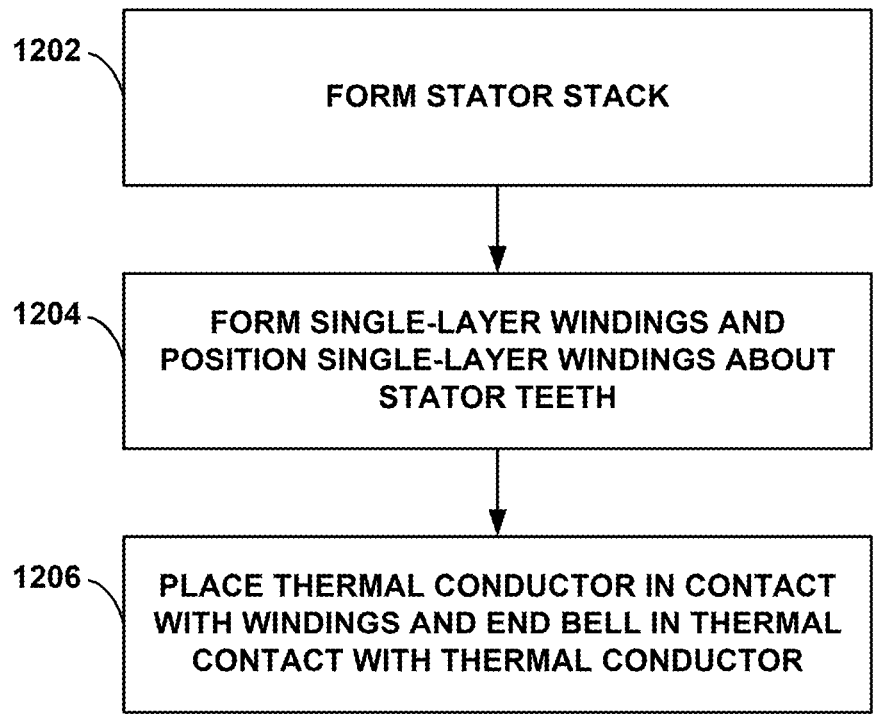
FIG. 12 is a flowchart of an example method of forming a stator body, in accordance with techniques of the present disclosure.

FIG. 12 is a flowchart of an example method of forming a stator assembly, in accordance with techniques of the present disclosure.

A stator stack may be formed (1202). For example, stator stack 202 may be formed as a lamination stack of base portion 206 and stator teeth 208. For example, base portion 206, alternatively referred to as a back iron, may be comprised of steel and/or iron and be punched or laser cut from steel and/or iron sheets. In some examples, stator teeth 208 may be comprised of a ferromagnetic material and may be punched or laser cut. In some examples, stator teeth 208 may be comprised of ferromagnetic steel. Stator stack 202 may be formed by lamination of stator teeth 208 to base portion 206 and/or welding of stator teeth 208 to base portion 206 and may be referred to as the lamination stack. In some examples, stator stack may be formed having substantially circular, or disk, shape. In some examples, base portion 206 and stator teeth 208 may be punched or laser cut together from steel and/or iron sheets and formed into a disk shape or cut/punched already in a circular/disk shape.

A single-layer winding of a conductive member including a plurality of turns may be formed (1204). For example, any of windings 204, 704, 904, and 1104 may be formed. In some examples, a single-layer winding may be formed around a stator tooth, or a single-layer winding may be formed separately from the stator tooth and positioned around the stator tooth. In some examples, a plurality of single-layer windings may be formed corresponding to each of stator teeth of a stator stack.

Each of the windings may be formed from respective conductive members having a thickness T in the radial direction that is less than its width Wc and/or Lc in a direction perpendicular to the radial direction. For example, the single-layer winding may be formed such as windings 204, 704, 904, and 1104, illustrated and described above. For example, the windings may be formed similar to windings 204 described above with each turn having substantially the same thickness T, width Wc, and width Lc. In some examples, the windings may be formed similar to windings 704 described above with each turn having substantially the same thickness T and width Lc, but the width Wc in the circumferential direction increases from a distal portion of the tooth to a proximal portion of the tooth adjacent the base portion such that a slot between first and second stator teeth is substantially filled. In some examples, the windings may be formed similar to windings 904 described above with each turn having substantially the same width Lc, but the width Wc varies such as described with respect to windings 704 and the thickness T in the radial direction increases from the proximal portions of the stator tooth adjacent the base portion to the distal portions of the stator tooth, and such that the surface area of each of the plurality of turns of windings 904 in a plane defined by the radial and circumferential directions is substantially the same. In some examples, a single-layer winding, such as any of windings 204, 704, 904, and 1104, illustrated and described above, may be comprised of an electrically conductive member having a continuous length wound around a stator teeth a number of times, e.g., having N turns. In some examples, a single-layer winding, such as any of windings 204, 704, 904, and 1104, illustrated and described above, may be comprised of a plurality of electrically conductive member segments electrically connected in series.

A thermally conductive member and an end bell may be formed and placed in thermal contact with the windings (1206). For example, thermally conductive member 504 may be in thermal contact with one or more turns of any of windings 204, 704, 904, or 1104 at one or both of the longitudinal ends of the stator stack, and end bell 608 may be in thermal contact with thermally conductive member 504.

The following examples may illustrate one or more aspects of the disclosure:

EXAMPLE 1

A stator assembly for an electric machine, the assembly comprising: a stator body including a base portion and a plurality of stator teeth projecting radially inward from the base portion; and an electrically conductive member wound about a tooth of the plurality of stator teeth to define a winding about the tooth, the winding comprising a single layer of the conductive member and including a plurality of turns of the electrically conductive member, wherein the electrically conductive member has a thickness in the radial direction that is less than its width in a direction perpendicular to the radial direction.

EXAMPLE 2

The stator assembly of example 1, wherein the electrically conductive member includes a first electrically conductive member and the tooth includes a first tooth, the stator assembly further comprising: a second electrically conductive member wound about a second tooth of the plurality of stator teeth to define a second winding about the second tooth, the second winding comprising a single layer of the second conductive member and including a plurality of turns of the second electrically conductive member, wherein the second electrically conductive member has a thickness in the radial direction that is less than its width in a direction perpendicular to the radial direction, wherein the first and second teeth are adjacent to each other, wherein the first and second conductive members define a slot fill factor greater than or equal to about 40 percent.

EXAMPLE 3

The stator assembly of any of examples 1-2, further comprising: a thermally conductive member in thermal contact with the electrically conductive member at a longitudinal end of the first winding, wherein the thermal impedance between the electrically conductive member and the thermally conductive member is less than the thermal impedance between the electrically conductive member and the tooth and the based portion.

EXAMPLE 4

The stator assembly of example 3, wherein the thermally conductive member is an electrical insulator.

EXAMPLE 5

The stator assembly of any of examples 3-4, further comprising at least one end bell configured to be in thermal contact with the thermally conductive member.

EXAMPLE 6

The stator assembly of any of examples 2-5, wherein a width of each of the plurality of turns of both the first and second electrically conductive members increases in a circumferential direction from a distal portion of the tooth to a proximal portion of the tooth adjacent the base portion such that a slot between the first and second stator teeth is substantially filled.

EXAMPLE 7

The stator assembly of example 6, wherein the first and second electrically conductive members define a slot fill factor greater than or equal to about 80 percent.

EXAMPLE 8

The stator assembly of any of examples 6-7, wherein a thickness in the radial direction of each of the plurality of turns of the first and second electrically conductive members increases from the proximal portions of the first and second teeth adjacent the base portion to the distal portions of the first and second teeth.

EXAMPLE 9

The stator assembly of example 8, wherein a surface area of each of the plurality of turns of the first and second electrically conductive members in a plane defined by the radial and circumferential directions is substantially the same.

EXAMPLE 10

The stator assembly of any of examples 1-9, wherein a cross-sectional shape of the first electrically conductive member in a plane containing the radial direction is substantially rectangular.

EXAMPLE 11

The stator assembly of any of examples 1-10, wherein a ratio of the width to the thickness is at least 2:1.

EXAMPLE 12

The stator assembly of any of examples 1-10, wherein a ratio of the width to the thickness is at least 10:1.

EXAMPLE 13

The stator assembly of any of examples 1-12, wherein a gap between each of the plurality of turns defines a breakdown voltage that is double the maximum voltage applied to the first conductive member.

EXAMPLE 14

The stator assembly of example 13, wherein an insulator is disposed between each of the plurality of turns.

EXAMPLE 15

The stator assembly of any of examples 1-14, wherein the conductive member is a continuous conductor.

EXAMPLE 16

The stator assembly of any of examples 1-14, wherein the conductive member comprises a plurality of electrically connected segments.

EXAMPLE 17

The stator assembly of example 16, wherein the electrically connected segments are welded to form the conductive member.

EXAMPLE 18

The stator assembly of any of examples 16-17, wherein the electrically connected segments are attached via one or more adhesives to form the conductive member.

EXAMPLE 19

An electric machine comprising: a rotor; and a stator comprising one or more stator assemblies, the one or more stator assemblies comprising: a stator body including a base portion and a plurality of stator teeth projecting radially inward from the base portion; and an electrically conductive member wound about a tooth of the plurality of stator teeth to define a winding about the first tooth, the winding comprising a single layer of the conductive member and including a plurality of turns of the electrically conductive member, wherein the electrically conductive member has a thickness in the radial direction that is less than its width in a direction perpendicular to the radial direction.

EXAMPLE 20

The electric machine of example 19, wherein the electrically conductive member includes a first electrically conductive member and the tooth includes a first tooth, the electric machine further comprising: a second electrically conductive member wound about a second tooth of the plurality of stator teeth to define a second winding about the second tooth, the second winding comprising a single layer of the second conductive member and including a plurality of turns of the second electrically conductive member, wherein the second electrically conductive member has a thickness in the radial direction that is less than its width in a direction perpendicular to the radial direction, wherein the first and second teeth are adjacent to each other, wherein the first and second conductive members define a slot fill factor greater than or equal to about 40 percent.

EXAMPLE 21

The electric machine of any of examples 19-20, further comprising: a thermally conductive member in thermal contact with the electrically conductive member at a longitudinal end of the winding, wherein the thermal impedance between the electrically conductive member and the thermally conductive member is less than the thermal impedance between the electrically conductive member and the tooth and the based portion.

EXAMPLE 22

The electric machine of example 21, wherein the thermally conductive member is an electrical insulator.

EXAMPLE 23

The electric machine of any of examples 21-22, further comprising at least one end bell configured to be in thermal contact with the thermally conductive member.

EXAMPLE 24

The electric machine of any of examples 20-23, wherein a width of each of the plurality of turns of both the first and second electrically conductive members increases in a circumferential direction from a distal portion of the tooth to a proximal portion of the tooth adjacent the base portion such that a slot between the first and second stator teeth is substantially filled.

EXAMPLE 25

The electric machine of example 24, wherein the first and second electrically conductive members define a slot fill factor greater than or equal to about 80 percent.

EXAMPLE 26

The electric machine of any of examples 24-25, wherein a thickness in the radial direction of each of the plurality of turns of the first and second electrically conductive members increases from the proximal portions of the first and second teeth adjacent the base portion to the distal portions of the first and second teeth.

EXAMPLE 27

The electric machine of example 26, wherein a surface area of each of the plurality of turns of the first and second electrically conductive members in a plane defined by the radial and circumferential directions is substantially the same.

EXAMPLE 28

The electric machine of any of examples 19-27, wherein a cross-sectional shape of the electrically conductive member in a plane containing the radial direction is substantially rectangular.

EXAMPLE 29

The electric machine of example 19-28, wherein a ratio of the width to the thickness is at least 2:1.

EXAMPLE 30

The electric machine of any of examples 19-28, wherein a ratio of the width to the thickness is at least 10:1.

EXAMPLE 31

The electric machine of any of examples 19-30, wherein a gap between each of the plurality of turns defines a breakdown voltage that is double the maximum voltage applied to the conductive member.

EXAMPLE 32

The electric machine of example 31, wherein an insulator is disposed between each of the plurality of turns.

EXAMPLE 33

The electric machine of any of examples 19-32, wherein the conductive member is a continuous conductor.

EXAMPLE 34

The electric machine of any of examples 19-32, wherein the conductive member comprises a plurality of electrically connected segments.

EXAMPLE 35

The electric machine of example 34, wherein the electrically connected segments are welded to form the conductive member.

EXAMPLE 36

The electric machine of any of examples 34-35, wherein the electrically connected segments are attached via one or more adhesives to form the conductive member.

EXAMPLE 37

The electric machine of any of examples 19-35, wherein the electric machine is a generator.

EXAMPLE 38

The electric machine of any of examples 19-36, wherein the electric machine is a motor.

EXAMPLE 39

The electric machine of any of examples 19-37, wherein the rotor is configured to rotate relative to the stator such that a current is generated in the first electrically conductive member via an electromagnetic force.

EXAMPLE 40

A method of forming a stator assembly, the method comprising forming a single-layer winding of an electrically conductive member including a plurality of turns around a stator tooth projecting radially inward from a base portion, wherein the electrically conductive member has a thickness in the radial direction that is less than its width in a direction perpendicular to the radial direction.

EXAMPLE 41

The method of example 40, further comprising: attaching a thermally conductive electrical insulator between a longitudinal end of a the single-layer winding an end bell and in thermal communication with the single-layer winding and the end bell.

EXAMPLE 42

The method of any of examples 40-41, wherein the single-layer winding includes a first single-layer winding, wherein the electrically conductive member includes a first electrically conductive member and the tooth includes a first tooth, the method further comprising: forming a second single-layer winding of a second electrically conductive member including a plurality of turns around a second stator tooth projecting radially inward from the base portion, wherein the second electrically conductive member has a thickness in the radial direction that is less than its width in a direction perpendicular to the radial direction, wherein the first and second teeth are adjacent to each other.

EXAMPLE 43

The method of example 42, wherein forming each of the first and second single-layer windings comprises forming a single-layer winding such that a width of each of the plurality of turns of the first and second electrically conductive members increases in a circumferential direction from a distal portion of the tooth to a proximal portion of the tooth adjacent the base portion such that a slot between the first and second stator teeth is substantially filled.

EXAMPLE 44

The method of example 43, wherein forming each of the first and second single-layer windings comprises forming a single-layer winding such that a turn thickness in the radial direction of each of the plurality of turns increases of the first and second electrically conductive members increases from the proximal portions of the first and second teeth adjacent the base portion to the distal portions of the first and second teeth.

EXAMPLE 45

The method of example 44, wherein a surface area of each of the plurality of turns of the first and second electrically conductive members in a plane defined by the radial and circumferential directions is substantially the same.

Various examples have been described. These and other examples are within the scope of the following claims.

What is claimed is:

1. A stator assembly for an electric machine, the assembly comprising:
   a stator body including a base portion and a plurality of stator teeth projecting radially inward from the base portion towards a longitudinal axis of a rotor;
   a first electrically conductive member wound about a first tooth of the plurality of stator teeth to define a first winding about the first tooth, the first winding comprising a single layer of the first electrically conductive member and including a plurality of turns of the first electrically conductive member,
   wherein the first electrically conductive member has a thickness in the radial direction that is less than its width in a direction perpendicular to the radial direction;
   a second electrically conductive member wound about a second tooth of the plurality of stator teeth to define a second winding about the second tooth, the second winding comprising a single layer of the second electrically conductive member and including a plurality of turns of the second electrically conductive member,
   wherein the second electrically conductive member has a thickness in the radial direction that is less than a width of the second electrically conductive member in a direction perpendicular to the radial direction,
   wherein the first tooth and the second tooth are adjacent to each other, wherein the first and second electrically conductive members define a slot fill factor greater than or equal to about 40 percent,
   wherein a width of each of the plurality of turns of the first electrically conductive member increases in a first circumferential direction from a distal portion of the first tooth to a proximal portion of the first tooth adjacent the base portion and a width of each of the plurality of turns of the second electrically conductive member increases in a second circumferential direction from a distal portion of the second tooth to a proximal portion of the second tooth adjacent the base portion such that a slot between the first tooth and the second tooth is substantially filled,
   wherein a thickness in the radial direction of each of the plurality of turns of the first and second electrically conductive members increases from the proximal portions of the first tooth and the second tooth adjacent the base portion to the distal portions of the first tooth and the second tooth;
   a thermally conductive member in thermal contact with an entire radial length of the first electrically conductive member at a longitudinal end face of the first winding; and
   an end bell, wherein a longitudinal end face of the thermally conductive member is in thermal contact with the end bell.

2. The stator assembly of claim 1, wherein a thermal impedance between the first electrically conductive member and the thermally conductive member is less than the thermal impedance between the first electrically conductive member and the first tooth and the based portion.

3. The stator assembly of claim 2, wherein the thermally conductive member is an electrical insulator.

4. The stator assembly of claim 2, further comprising at least one end bell configured to be in thermal contact with the thermally conductive member.

5. The stator assembly of claim 1, wherein the slot fill factor is greater than or equal to about 80 percent.

6. The stator assembly of claim 1, wherein a surface area of each of the plurality of turns of the first electrically conductive member in a plane defined by the radial and first circumferential directions is substantially the same, wherein a surface area of each of the plurality of turns of the second electrically conductive member in a plane defined by the radial and second circumferential directions is substantially the same.

7. The stator assembly of claim 1, wherein the thermally conductive member is substantially disk-shaped.

8. An electric machine comprising:
   a rotor; and
   a stator comprising one or more stator assemblies, the one or more stator assemblies comprising:
      a stator body including a base portion and a plurality of stator teeth projecting radially inward from the base portion towards the rotor;
      a first electrically conductive member wound about a first tooth of the plurality of stator teeth to define a first winding about the first tooth, the first winding comprising a single layer of the first electrically conductive member and including a plurality of turns of the first electrically conductive member,
      wherein the first electrically conductive member has a thickness in the radial direction that is less than its width in a direction perpendicular to the radial direction;
      a second electrically conductive member wound about a second tooth of the plurality of stator teeth to define a second winding about the second tooth, the second winding comprising a single layer of the second electrically conductive member and including a plurality of turns of the second electrically conductive member, wherein the second electrically conductive member has a thickness in the radial direction that is less than its width in a direction perpendicular to the radial direction, wherein the first tooth and the second tooth are adjacent to each other, wherein the first and second electrically conductive members define a slot fill factor greater than or equal to about 40 percent, wherein a width of each of the plurality of turns of the first electrically conductive member increases in a first circumferential direction from a distal portion of the first tooth to a proximal portion of the first tooth adjacent the base portion and a width of each of the plurality of turns of the second electrically conductive member increases in a second circumferential direction from a distal portion of the second tooth to a proximal portion of the second tooth adjacent the base portion such that a slot between the first tooth and the second tooth is substantially filled, wherein a thickness in the radial direction of each of the plurality of turns of the first and second electrically conductive members increases from the proximal portions of the first tooth and the second tooth adjacent the base portion to the distal portions of the first tooth and the second tooth;

a thermally conductive member in thermal contact with an entire radial length of the first electrically conductive member at a longitudinal end face of the first winding; and an end bell, wherein a longitudinal end face of the thermally conductive member is in thermal contact with the end bell.

9. The electric machine of claim 8, wherein a thermal impedance between the first electrically conductive member and the thermally conductive member is less than the thermal impedance between the first electrically conductive member and the first tooth and the based portion.

10. The electric machine of claim 9, wherein the thermally conductive member is an electrical insulator.

11. The electric machine of claim 9, further comprising at least one end bell configured to be in thermal contact with the thermally conductive member.

12. The electric machine of claim 9, wherein a surface area of each of the plurality of turns of the first electrically conductive member in a plane defined by the radial and first circumferential directions is substantially the same, wherein a surface area of each of the plurality of turns of the second electrically conductive member in a plane defined by the radial and second circumferential directions is substantially the same.

13. A method of forming a stator assembly, the method comprising:

forming a first single-layer winding of a first electrically conductive member including a plurality of turns around a first stator tooth projecting radially inward towards a rotor from a base portion, wherein the first electrically conductive member has a thickness in the radial direction that is less than its width in a direction perpendicular to the radial direction;

forming a second single-layer winding of a second electrically conductive member including a plurality of turns around a second stator tooth projecting radially inward towards the rotor from the base portion, wherein the second electrically conductive member has a thickness in the radial direction that is less than its width in a direction perpendicular to the radial direction, wherein the first stator tooth and the second stator tooth are adjacent to each other, wherein forming the first single-layer winding comprises forming a single-layer winding such that a width of each of the plurality of turns of the first electrically conductive member increases in a first circumferential direction from a distal portion of the first stator tooth to a proximal portion of the first stator tooth adjacent the base portion and forming a single-layer winding such that a width of each of the plurality of turns of the second electrically conductive member increases in a second circumferential direction from a distal portion of the second stator tooth to a proximal portion of the second stator tooth adjacent the base portion such that a slot between the first stator tooth and the second stator tooth is substantially filled, wherein forming each of the first and second single-layer windings comprises forming a single-layer winding such that a turn thickness in the radial direction of each of the plurality of turns of the first and second electrically conductive members increases from the proximal portions of the first stator tooth and the second stator tooth adjacent the base portion to the distal portions of the first stator tooth and the second stator tooth;

placing a thermally conductive member in thermal contact with an entire radial length of the first electrically conductive member at a longitudinal end face of the first single-layer winding; and placing an end bell in thermal contact with a longitudinal end face of the thermally conductive member.

* * * * *